United States Patent [19]
Sonoda et al.

[11] Patent Number: 5,768,150
[45] Date of Patent: Jun. 16, 1998

[54] DEVICE AND METHOD FOR MEASURING A CHARACTERISTIC OF AN OPTICAL ELEMENT

[75] Inventors: Tunehiko Sonoda; Masahiro Oono; Masato Noguchi, all of Tokyo, Japan

[73] Assignee: Asahi Kogaku Kogyo Kabushiki Kaisha, Tokyo, Japan

[21] Appl. No.: 833,522

[22] Filed: Apr. 7, 1997

Related U.S. Application Data

[63] Continuation of Ser. No. 321,853, Oct. 14, 1994, abandoned.

[30] Foreign Application Priority Data

Oct. 14, 1993 [JP] Japan ................................. 5-281963
Dec. 27, 1993 [JP] Japan ................................. 5-353505

[51] Int. Cl.$^6$ ................ G01B 9/02; G01B 11/24; G01B 11/00; G01M 11/00
[52] U.S. Cl. ................ 364/525; 356/355; 356/363; 356/359
[58] Field of Search .................. 364/525; 356/355, 356, 354, 359, 358, 357, 363, 345, 375, 376, 373, 360, 124, 124.5; 250/550

[56] References Cited

U.S. PATENT DOCUMENTS

| | | | |
|---|---|---|---|
| 3,791,739 | 2/1974 | Kawasaki | 356/106 R |
| 3,820,902 | 6/1974 | Kawasaki | 356/106 |
| 4,697,927 | 10/1987 | Ono | 356/360 |
| 4,886,362 | 12/1989 | Oono | 356/349 |
| 5,151,752 | 9/1992 | Oono et al. | 356/128 |
| 5,157,459 | 10/1992 | Oono et al. | 356/359 |
| 5,257,092 | 10/1993 | Noguchi et al. | 356/367 |
| 5,335,059 | 8/1994 | Maruyuma et al. | 356/124 |
| 5,410,532 | 4/1995 | Ohno et al. | 369/112 |
| 5,448,355 | 9/1995 | Noguchi et al. | 356/354 |

FOREIGN PATENT DOCUMENTS

| | | | |
|---|---|---|---|
| 62-129707 | 6/1987 | Japan | G01B 11/24 |
| 4-48201 | 2/1992 | Japan | G01B 9/02 |

*Primary Examiner*—Emanuel Todd Voeltz
*Assistant Examiner*—Tony M. Cole
*Attorney, Agent, or Firm*—Greenblum & Bernstein P.L.C.

[57] ABSTRACT

A device for measuring a characteristic of an optical element which forms an interference fringe pattern using a reference light beam reflected from a reference surface and a test light beam that is guided from the optical element by a light refracting element. The interference fringe pattern is detected and data corresponding to the interference fringe pattern is output. The outputted data is processed such that information of wave front aberration representative of the interference fringe pattern is output. The information includes mathematical terms representative of position errors and of the characteristic of the optical element. The mathematical terms are calculated, and the mathematical terms representative of the characteristic of the optical element are corrected based on a value of at least one of the mathematical terms representative of the position errors. The corrected mathematical terms are then displayed.

37 Claims, 20 Drawing Sheets

— SPHERICAL ABERRATION
---- SINE CONDITION

— SPHERICAL ABERRATION
---- SINE CONDITION $W_{40} = a_4 W_{20} + b_4$
(Approximate expression)

X : Measuring value $W_{60} = a_6 W_{20} + b_6$
(Approximate expression)

X : Measuring value

DEVICE AND METHOD FOR MEASURING A CHARACTERISTIC OF AN OPTICAL ELEMENT

This application is a continuation of application Ser. No. 08/321,853, filed Oct. 14, 1994, now abandoned.

BACKGROUND OF THE INVENTION

The present invention relates to a device and method for measuring a characteristic of an optical element (e.g. a mirror or lens) using an interference fringe pattern measuring method. More specifically, the present invention relates to a device that is able to measure a characteristic of an optical element with a high degree of accuracy, even if a positioning error occurs in the placement of the optical element in the device.

The measuring accuracy of the device and method for measuring the characteristic of the optical element are determined by the accuracy of an interferometer used with the device. For example, aberrations of the interferometer such as aberrations of the reference lens or reference surfaces will limit the measuring accuracy.

Methods for removing the effects of aberrations of the interferometer are known, for example, in Bruning's measuring method, as well as in a method disclosed in Japanese, patent laid-open publication No. SHO 62-129707.

The measuring method suggested by Bruning comprises a step for measuring a characteristic of an optical element to be tested under three different conditions, and a step for removing identical aberrations of the interferometer by calculating the results of the measuremnts.

Further, the interferometer disclosed in the Japanese publication '707 measures interference fringe patterns of a known reference object, and stores the results as correction data. Then, the interference fringe pattern of the object under test is measured, and the measurement results are corrected using the stored correction data.

However, it is difficult for both the Bruning's method and the interferometer disclosed in Japanese publication '707 to correct aberrations that occur as a result of errors (such as defocus or tilt) in the positioning of the optical element under test.

More specifically, when a numerical aperture NA of a reference lens of an interferometer is large, for example, larger than 0.7, the defocus generates high order symmetrical aberrations such as spherical aberrations. Further, the accuracy of the measurement of the characteristic of the optical element is decreased.

SUMMARY OF THE INVENTION

It is therefore an object of the present invention to provide an improved device and method for measuring interference fringe patterns of objects such as lense and mirrors, which takes into consideration errors in the wave front aberration as a result of errors in the positioning of the object under test.

According to one aspect of the present invention, there is provided a device for measuring a characteristic of an optical element the device includes:

a mechanism for forming an interference fringe pattern using a reference light beam reflected from a reference surface and a test light beam that is guided from the optical element by a light refracting element;

a mechanism for detecting the interference fringe pattern, the detecting means outputting data corresponding to the interference fringe pattern;

a mechanism for processing the output data, the processing mechanism outputting information of wave front aberration representative of the interference fringe pattern, wherein the information includes at least mathematical terms representative of position errors of the optical element and mathematical terms representative of the characteristic of the optical element;

mechanism for calculating the mathematical terms;

a mechnism for correcting at least one of the mathematical terms representative of the characteristic of the optical element based on a value of at least one of the mathematical term representative of the position errors; and a mechanism for displaying the corrected mathematical terms representative of the characteristic of the optical element.

According to another aspect of the present invention, there is provided a device for measuring a characteristic of an optical element. The device includes:

a mechanism for forming an interference fringe pattern using a reference light beam reflected from a reference surface and a test light beam that is guided from the optical element by a light refracting element;

a mechanism for detecting the interference fringe pattern, the detecting means outputting data corresponding to the interference fringe pattern;

a mechanism for processing information representative of the interference fringe pattern, the information defining wave front aberrations $W(\rho,\phi)$ as:

$$W(\rho,\phi) = \sum_{n=0}^{k} \sum_{l=0}^{n} W_{nl}\rho^n \cos^l \phi$$

$$= W_{11}\rho \sin\phi + W_{12}\rho \cos\phi + W_{20}\rho^2 +$$

$$W_{22}\rho^2 \cos^2\phi + W_{31}\rho^3 \cos\phi +$$

$$W_{32}\rho^3 \sin\phi + W_{40}\rho^4 + W_{51}\rho^3 \cos\phi +$$

$$W_{52}\rho^3 \sin\phi + W_{60}\rho^6 + \ldots$$

where, $\rho = h/h_{max}$ h:incident height, $h_{max}$:maximum incident height, $\phi$:polar coordinate angle, k,l,n:non-negative integers (0,1,2, . . .), $W_{11}, W_{12}, W_{20}, W_{22}, W_{31}, W_{32}, W_{40}, W_{51}, W_{52}, W_{60}$: coefficients of each aberration;

a mechanism for calculating the coefficients $W_{11}, W_{12}, W_{20}, W_{22}, W_{31}, W_{32}, W_{40}, W_{51}, W_{52}, W_{60} \ldots$ of the polynomial expression;

a mechanism for correcting at least one of the coefficients $W_{31}, W_{32}, W_{40}, W_{51}, $ Wlhd 52, $W_{60} \ldots$ which are representative of the characteristic of the optical element, based on values of at least one of the coefficients $W_{11}, W_{12}, W_{20}$ which are representative of a position error of said optical element; and a mechanism for displaying the corrected coefficients corresponding to the coeffients $W_{31}, W_{32}, W_{40}, W_{51}, W_{52}, W_{60} \ldots$ According to a further aspect of the present invention, there is provided a method of measuring a characteristic of an optical element. The method includes the steps of:

forming an interference fringe pattern using a reference light beam reflected from a reference surface and a test light beam that is guided from the optical element by a light refracting element;

detecting the interference fringe pattern;

outputting data corresponding to the detected interference fringe pattern;.

calculating information of wave front aberrations, corresponding to the output data, representative of the interference fringe pattern. wherein the information includes at least mathematical terms representative of position errors of the optical element and mathematical terms representative of the characteristic of the optical element;

calculating the mathematical terms;

correcting at least one of the mathematical terms representative of the characteristic of the optical element based on a value of at least one of the mathematical terms representative of the position errors; and displaying the corrected mathematical terms representative of the characteristic of the optical element.

According to a still further aspect of the present invention. there is provided a method of measuring a characteristic of an optical element. The method includes the steps of:

forming a reference interference fringe pattern using a reference light beam reflected from a reference surface and a test light beam that is guided from a reference optical element by a light refracting element;

detecting the reference interference fringe pattern;

determining effects of defocus and/or tilt of the reference optical element on the detected interference fringe pattern;

storing the determined effects in a memory;

forming an interference fringe pattern using the reference light beam reflected from the reference surface and another test light beam that is guided from the optical element by the light refracting element;

detecting the interference fringe pattern;

outputting data corresponding to the detected interference fringe pattern;

calculating information, corresponding to the output data, representative of the interference fringe pattern; and correcting the information using the correcting data.

DESCRIPTION OF THE EMBODIMENTS

Figure 1:
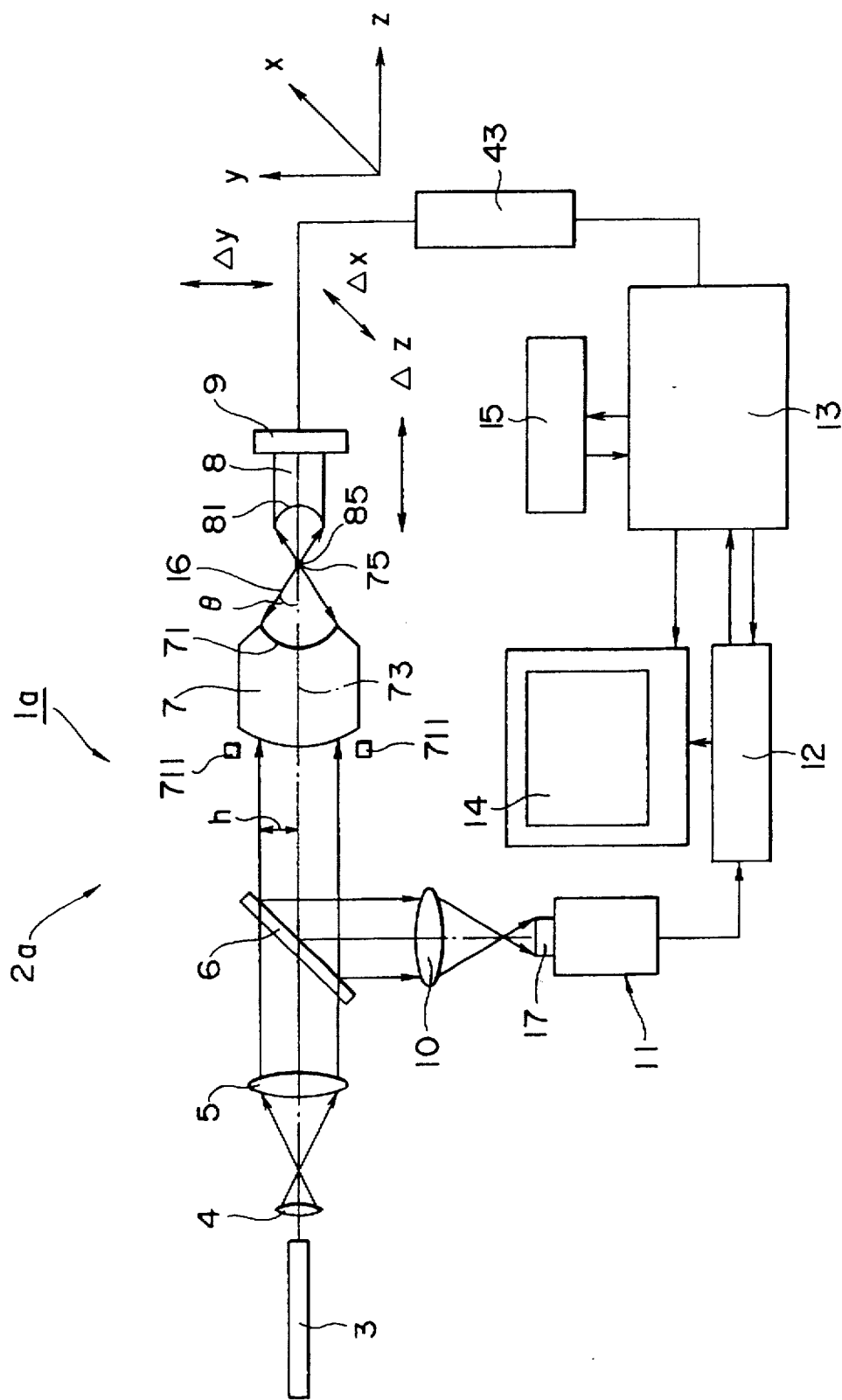
FIG. 1 shows a Fizeau type interferometer used for measuring interference fringe patterns according to the present invention.

FIG. 1 illustrates a measuring device 1a according to an embodiment of the present invention.

The measuring device 1a includes a Fizeau type interferometer 2a. an image receiving portion 11. and an image processing device 12 that has an A/D converter and an image memory. The measuring device further includes a calculating device 13. a monitor 14 and a correction data memory 15.

In the optcal system of the interferometer 2a. a beam emitted by a light source 3. such as a laser source. is expanded by a beam expander which includes an objective lens 4 and a collimator lens 5. The expanded beam then passes through a half mirror 6 to a standard converging lens 7. One surface 71 of the standard lens 7 acts as a reference surface. The reference surface 71 is formed as a concave surface having a center of curvature which is coincident with a light converging point 75 of the standard lens 7.

A part of the reference light beam reflected from the surface 71 is reflected by the half mirror 6 and is refracted by an observing lens 10 on an image receiving device 17, such as a CCD, of the image receiving portion 11.

The light beam passing through the standard lens 7 is reflected from a surface-under-test 81 of a test lens 8. The light beam reflected by the test lens 8 forms a testing light beam. A part of the testing light beam is reflected by the half mirror 6 and is incident on the image receiving device 17. The reference light beam reflected by the surface 71 and the testing light beam reflected by the surface 81 interfere with each other to form interference fringe patterns on the image receiving device 17.

The standard lens 7 can be precisely moved along an optical axis z direction by a phase shifting device 711, such as a PZT (piezoelectric transducer) device. The phase shift device 711 is used for quantifying interference fringe patterns by the well known phase shift method in order to determine a shape of the surface 81 of the test lens 8. The test lens 8 is attached to a driving device 9 that moves the test lens 8 in the optical axis z direction, as well as x and y directions that are in a vertical plane perpendicular to the optical axis z direction. A drive controller 43 is instructed by the calculating device 13 to control the driving device 9 to align the test lens 8.

The analog output signal from the image receiving portion 11 represents the dark and light areas of the interference fringe pattern detected by the image receiving device 17. This analog signal is then processed by the image processing device 12 and is converted into digital image data representing the interference fringe patterns (given in polar coordinates $\rho, \phi$). The interference fringe pattern detected by the interferometer 2a, maps a phase difference between the reference light beam and the testing light beam.

The calculating device 13 analyzes the digital interference fringe data to determine correction data and aberration data of the test lens 8. In the present embodiment, the calculating device 13 is a microcomputer.

The calculating device 13 primarily determines the aberration of the surface 81, of the test lens 8. When the calculating device 13 determines the aberrations, the calculating device 13 corrects errors included in the aberration data as a result of defocus or tilt errors due to a positioning error of the test lens 8 (and therefore the surface 81) in the interferometer 2a.

Two methods according to the present invention for correcting the errors in the aberration data will be described below. Initially, the wave front aberrations of the detected interference fringe pattern are expressed in the form of a polynomial expression, also described below.

The wave front aberrations of the interference fringe pattern can be expanded into a polynomial expression that expresses wave front aberrations by Zernike's or Seidel's coefficient expansion. For example, the wave front aberration $W(\rho,\phi)$ is expanded as the following Fourier-like expression (1).

$$W(\rho,\phi) = \sum_{n=0}^{k} \sum_{l=0}^{n} W_{nl}\rho^n \cos^l \phi \quad (1)$$

$$= W_{11}\rho \sin\phi + W_{12}\rho \cos\phi + W_{20}\rho^2 +$$
$$W_{22}\rho^2 \cos^2\phi + W_{31}\rho^3 \cos\phi +$$
$$W_{32}\rho^3 \sin\phi + W_{40}\rho^4 + W_{51}\rho^3 \cos\phi +$$
$$W_{52}\rho^3 \sin\phi + W_{60}\rho^6 + \ldots$$

where, $\rho = h/h_{max}$ h:incident height, $h_{max}$:maximum incident height, $\phi$:polar coordinate angle, k,l,n:non-negative integers (0,1,2, ... ), $W_{nl}$:coefficients of each aberration.

The term $h_{max}$ is defined as a maximum incident height of a light beam which is just high enough to illuminate an area of the object 8 under test to be measured.

Each term of the equation (1) can be obtained by fitting the analyzed interference fringe pattern data using the least squares approximation method. The first two terms $W_{11}\rho \sin\phi$ and $W_{12}\rho \cos\phi$ represent the effect of the tilt, while the third term $W_{20}\rho^2$ represents the effect of the defocus. These three terms represent positioning errors of the test lens 8 when the interference fringe patterns are analyzed, and can be removed so as to have no effect.

The defocus is defined as a positioning error of the test lens 8 along the optical axis z direction. The amount of the defocus is expressed by $\Delta Z$ and is related to a distance between a converging point 75 and a center of curvature 85 of the test surface 81. More specifically, if the distance between the converging point 75 and the center of curvature 85 is increased by a factor $\Delta Z1$, then the optical path length for light reflected from the surface 81 will have increased by $2\Delta Z1$. Therefore, the defocus $\Delta Z$ is defined as being twice an actual distance between the converging point 75 and the center of curvature 85 of the test surface 81.

The tilt is defined as a positioning error of the test lens 8 along the x and/or y directions, as shown in FIG. 1. The amount of the tilt is a distance between the center of curvature 85 and the optical axis in the x-y plane and is expressed by $\Delta x$ or $\Delta y$.

Each aberration is expressed in the different order terms of the polynomial. For example, spherical aberrations are expressed by even order terms higher than the second order term. Coma aberrations are expressed by odd order terms higher than the third order term. Therefore, these effects on the higher order terms of the wave aberrations can be detected by analyzing the corresponding terms. Further, the shape of the lens-under-test can be confirmed by this analysis.

However, these higher order even terms include not only spherical aberrations occurring at the surface 81, but also the effects of the defocus. Similarly, the higher order odd terms include not only coma aberrations occurring at the surface 81, but also the effects of tilt. Therefore, conventionally it has been impossible to detect the aberrations accurately when positioning errors occur. Further, it was also impossible to determine whether the surface of the lens under test had the proper shape.

The effects of the defocus and the tilt are different depending on whether the standard lens 7 is aplanatic or not. An aplanatic lens satisfies the sine condition, given below:

h=f·sin θ where, h:height of light ray incident on the standard lens 7.

f:focal length of the standard lens 7,

θ:angle formed between exit light ray and optical axis 73.

If the standard lens 7 is aplanatic, since the tilt does not affect the odd order terms higher than the first order term, the wave aberration due to the tilt can be removed by subtracting only the main tilt related terms $W_{11}\rho \sin \phi$ and $W_{12}\rho \cos \phi$ of the equation (1). Further, the wave front aberration due to the defocus is included in all of the even order terms, but the magnitude of the effect in the even order terms higher than the second order can be analytically determined based on the defocus amount ΔZ.

The first method of the present invention is to remove the effect of the defocus ΔZ which is analytically determined, from the even order terms higher than the second order term, in order to accurately detect the wave front aberrations of the surface 81 of the test lens 8 without including the effect of the defocus ΔZ.

The first method is effective when the standard lens substantially satisfies the sine condition. The order of the polynomial expansion of equation (1) is determined according to a numerical aperture NA, of the standard lens.

If the standard lens 7 is not aplanatic, the tilt affects the odd order terms higher than first order term in the equation (1), in addition to the effects of the defocus as mentioned above. Thus, the effect of the tilt and/or defocus cannot be analytically determined.

The second method of the present invention removes the effects of the defocus Δz and the tilt Δx and/or Δy from the measured wave front aberration of a surface of a lens under test by first determining these effects on a reference lens or mirror.

Examples of the relationship between the wave front aberration and the defocus and/or the tilt will be described below, taking into consideration the sine condition and the numerical aperture NA.

Figure 2:
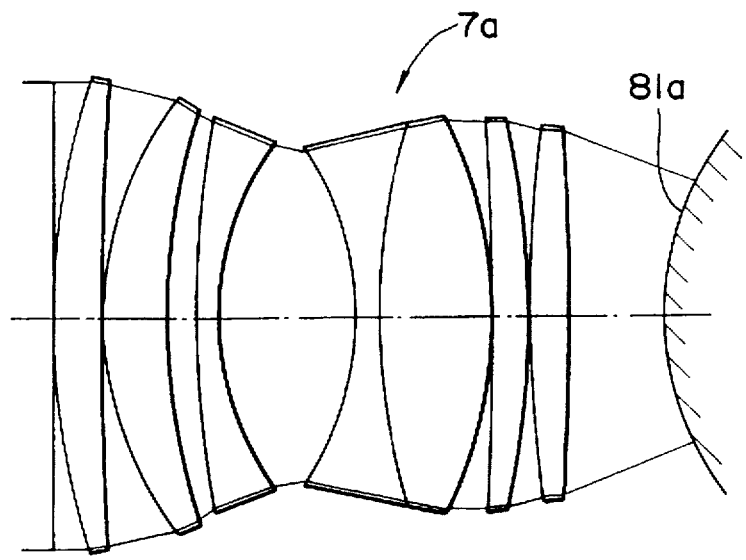
FIG. 2 shows an example of a standard lens that is aplanatic.
Figure 3:
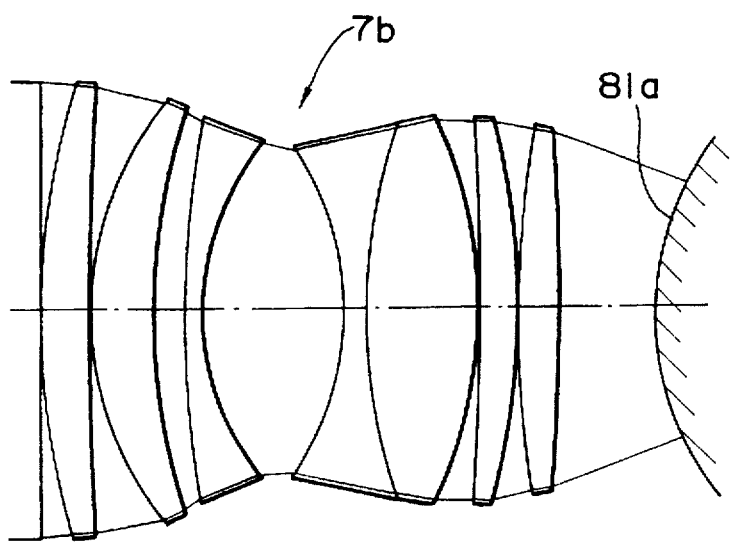
FIG. 3 sw an example of a standard lens that is non-aplanatic.

FIG. 2 shows an aplanatic converging lens 7a that substantially satisfies the sine condition, while FIG. 3 shows a non-aplanatic converging lens 7b that does not satisfy the sine condition. The incident light rays pass through the lenses 7a and 7b before and after the light rays are reflected by a convex reflecting surface 81a that has no aberrations. These converging lens 7a and 7b have almost the same construction, except that only converging lens 7a satisfies the sine condition.

Figure 4:
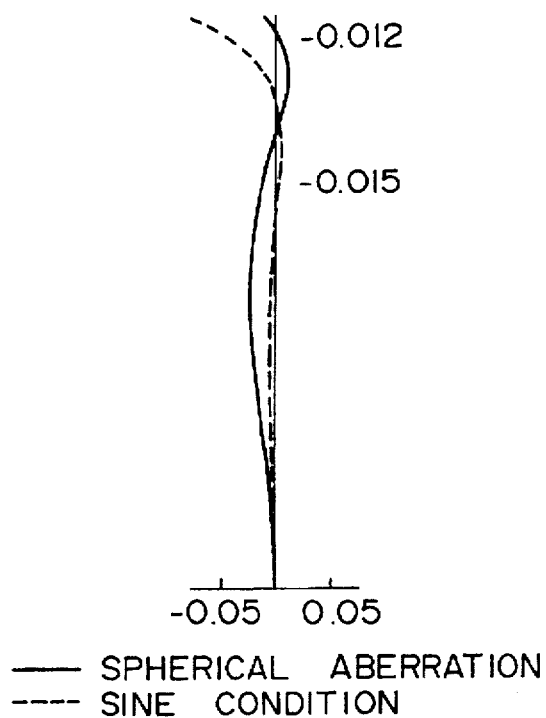
FIG. 4 is a graph showing a spherical aberration and a sine condition for the aplanatic lens shown in FIG. 2.
Figure 5:
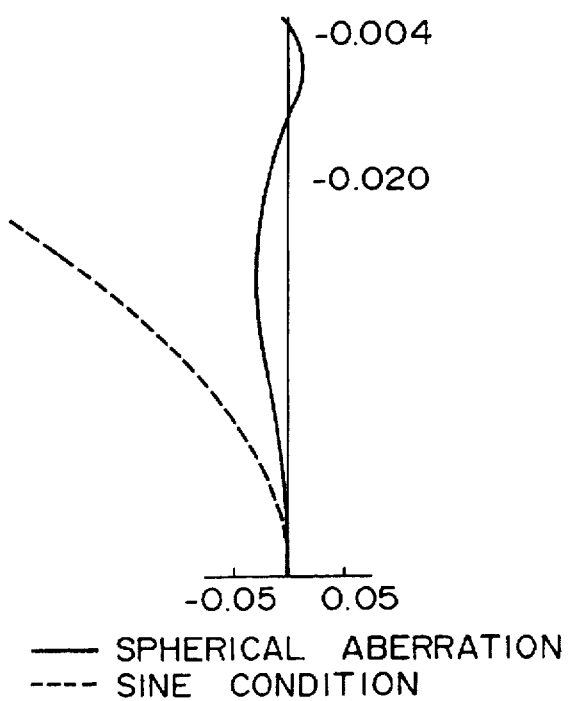
FIG. 5 is a graph showing a spherical aberration and a sine condition for the non-aplanatic lens shown in FIG. 3.

FIGS. 4 and 5 show spherical aberration SA and the sine condition SC of the converging lenses 7a and 7b, respectively. The vertical axes of FIGS. 4 and 5 represent the height of incident light, while the horizontal axes represent the amount of spherical aberration.

Figure 6:
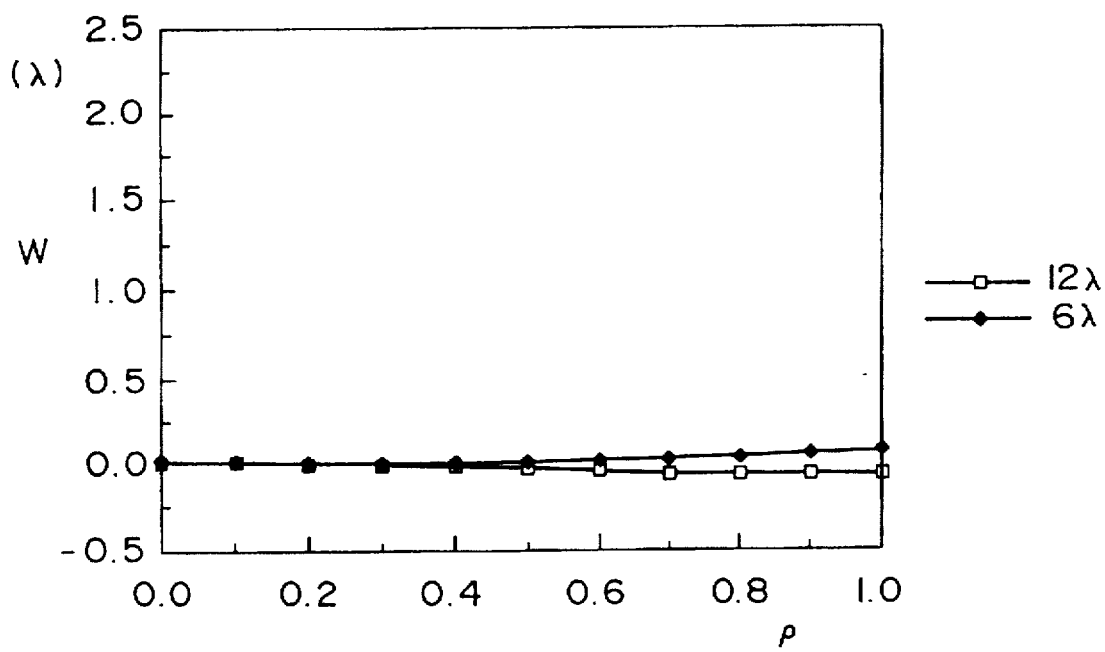
FIG. 6 is a graph showing a relationship between wave front aberrations and a height of an incident light ray under predetermined defocus conditions using the aplanatic lens shown in FIG. 2.
Figure 7:
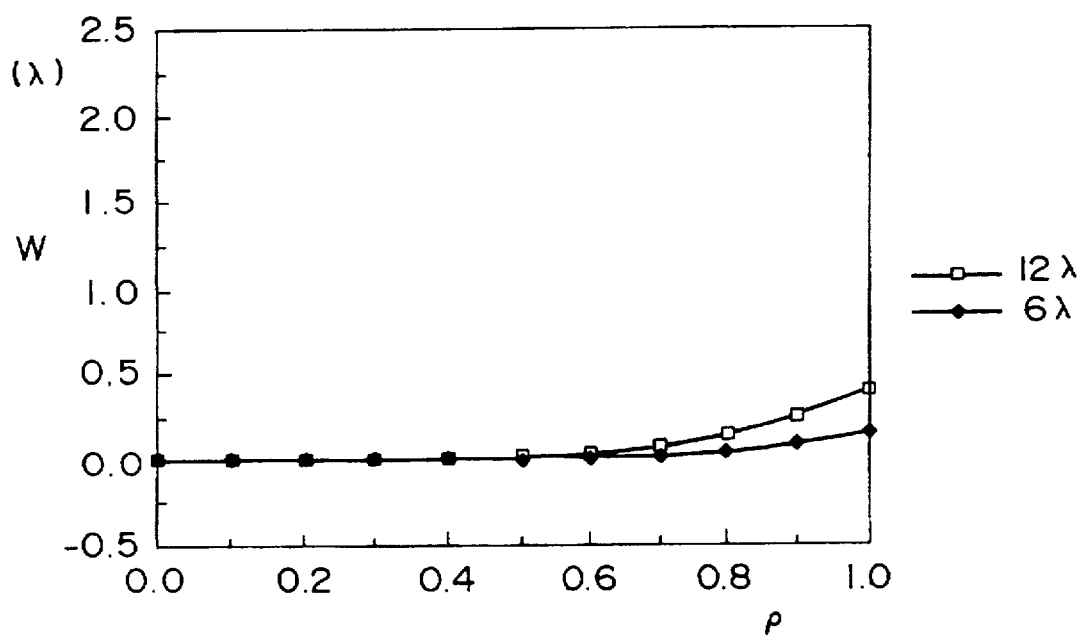
FIG. 7 is a graph showing a relationship been wave front aberrations and a height of an incident light ray under predetermined defocus conditions using the non-aplanatic lens shown in FIG. 3.

FIGS. 6 and 7 show the relationship between the wave front aberration and the height of incident light rays that are analyzed by a ray tracing method, under the conditions that the defocus Δz is equal to six times the wavelength λ of the light source (6λ), and twelve times the wavelength (12λ). The horizontal axis of FIGS. 6 and 7 represents normalized height of incidence $\rho(=h/h_{max})$, while the vertical axis represents the amount of the wave front aberration measured in units of wavelength λ of the light source.

Aberrations corresponding to even order terms higher than the second order term, such as spherical aberrations, are shown in the FIGS. 6 and 7. These aberrations do not include the main defocus term $W_{20} \rho^2$.

FIG. 6 shows the result using the aplanatic converging lens 7a that satisfies the sine condition, while FIG. 7 shows the result using the non-aplanatic converging lens 7b that does not satisfy the sine condition. These results show that the effects of the defocus on these higher order even terms becomes larger if the non-aplanatic converging lens 7b is used, than if the aplanatic converging lens 7a is used. Further, the effect of the defocus on these higher order even terms linearly increases according to an increase in the amount of defocus.

Figure 8:
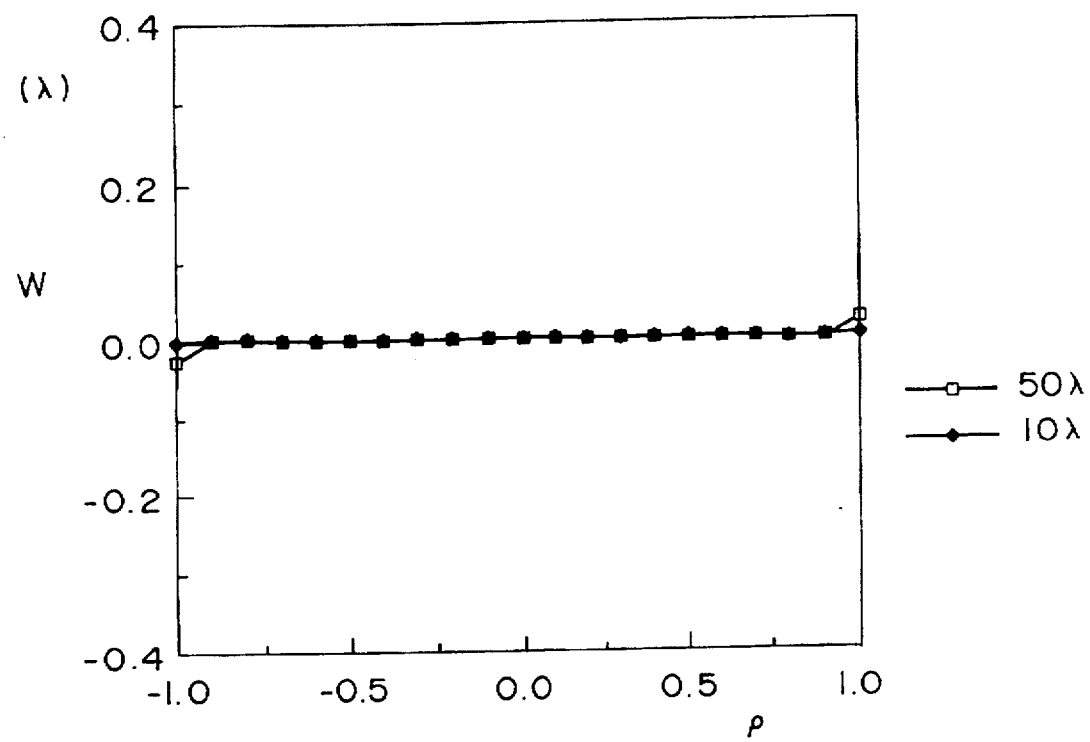
FIG. 8 is a graph showing a relationship between wave front aberrations and a height of an incident light ray under predetemihnd tilt conditions using the aplanatic lens shown in FIG. 2.
Figure 9:
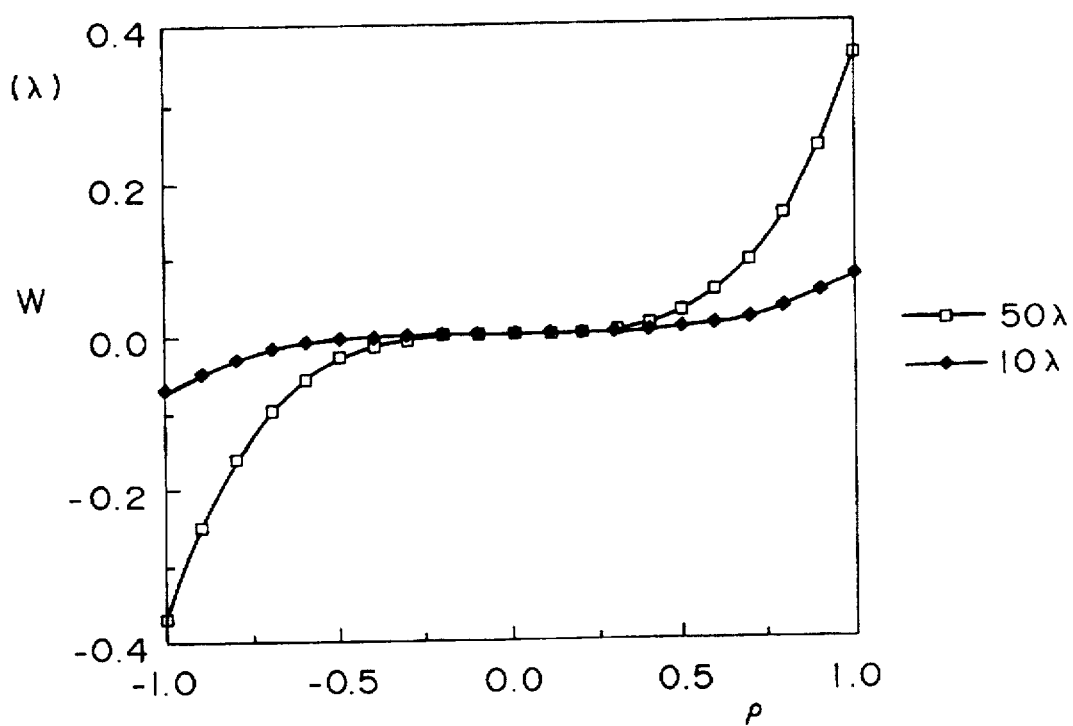
FIG. 9 is a graph shwing a relationship between wave front aberrations and a height of an incident light ray under predetermined tilt conditions using the non-aplanatic lens shown in FIG. 3.

FIGS. 8 and 9 show the relationship between the wave front aberration and the height of incident light rays that are analyzed by the ray tracing method under the conditions that the tilt Δx is equal to ten times the wavelength λ (10λ) or fifty times the wavelength (50λ). The axial coordinates are the same as those for FIGS. 6 and 7.

Aberrations corresponding to these higher order odd terms, such as a coma aberration, are shown in the FIGS. 8 and 9. These aberrations do not include the main tilt terms $W_{11}\rho \sin \phi$ and $W_{12}\rho \cos \phi$.

FIG. 8 shows the results using the aplanatic converging lens 7a, while FIG. 9 shows the results using the non-aplanatic converging lens 7b. These results show that the effects of the tilt on these higher odd order terms is much greater when the non-aplanatic converging lens 7b is used, as shown in FIG. 9, than when the aplanatic converging lens 7a is used, as shown in FIG. 8. Further, the effect of the tilt on these higher odd order terms linearly increases according to an increase in the amount of tilt.

The relationship between the defocus and the higher order even terms is also affected by the numerical aperture NA of the lens. The numerical aperture NA of a lens which satisfies the sine condition, is related to an f-number of the lens as shown below:

$$NA = \frac{1}{2 \cdot f\text{-number}}$$

where, f-number=f/d f:focal length of the lens, and d:effective diameter of the lens.

Figure 10:
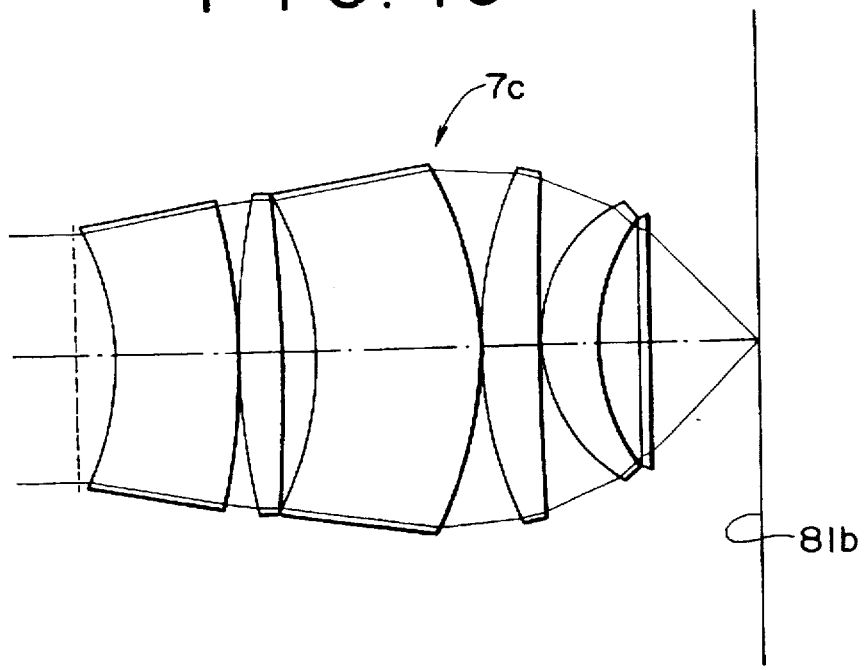
FIG. 10 shows an example of a standard lens that has a high numerical aperture NA.
Figure 11:
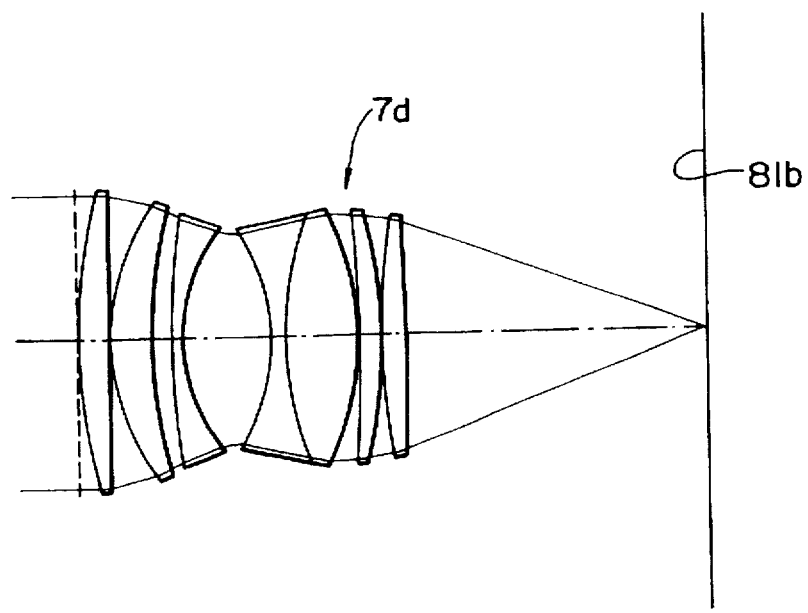
FIG. 11 shows an example of a standard lens that has a low numerical aperture NA.

FIG. 10 shows a converging lens 7c having an f-number of 0.7, while FIG. 11 shows a converging lens 7d having an f-number of 1.4. Both of these converging lenses 7c and 7d satisfy the sine condition. The following description describes the effect on the aberration when the converging lenses 7c and 7d are used instead of converging lens 7.

Figure 12:
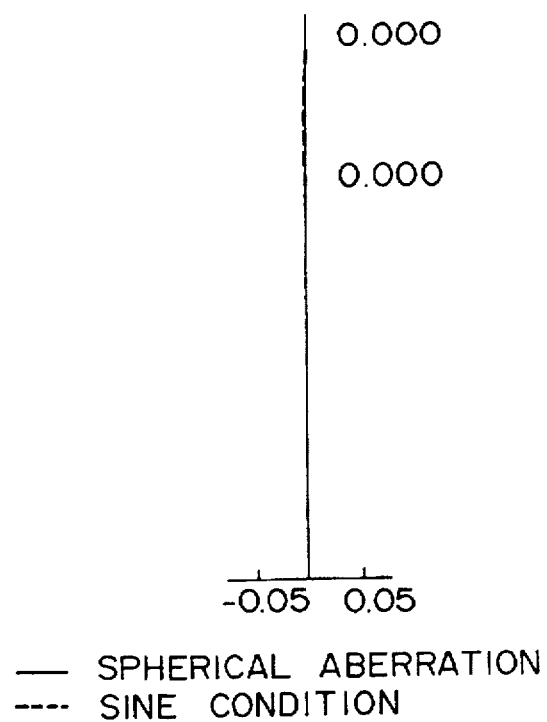
FIG. 12 is a graph showing a spherical aberration and a sine condition of the standard lens shown in FIG. 10.
Figure 13:
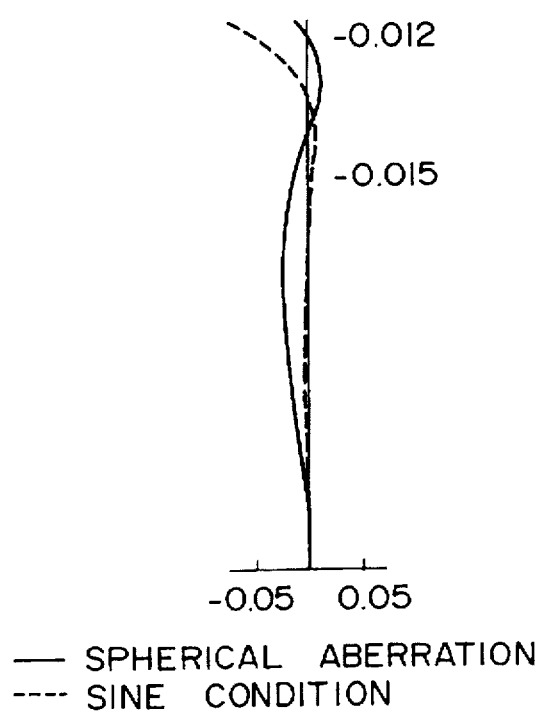
FIG. 13 is a graph showing a spherical aberration and a sine condition of the standard lens shown in FIG. 11.

The incident light rays pass through the lenses 7c and 7d before and after the light rays are reflected by a plane reflecting surface 81b that has no aberrations. FIG. 12 shows the corrected spherical aberration for converging lens 7c, while FIG. 13 shows the corrected spherical aberration for converging lens 7d.

Figure 14:
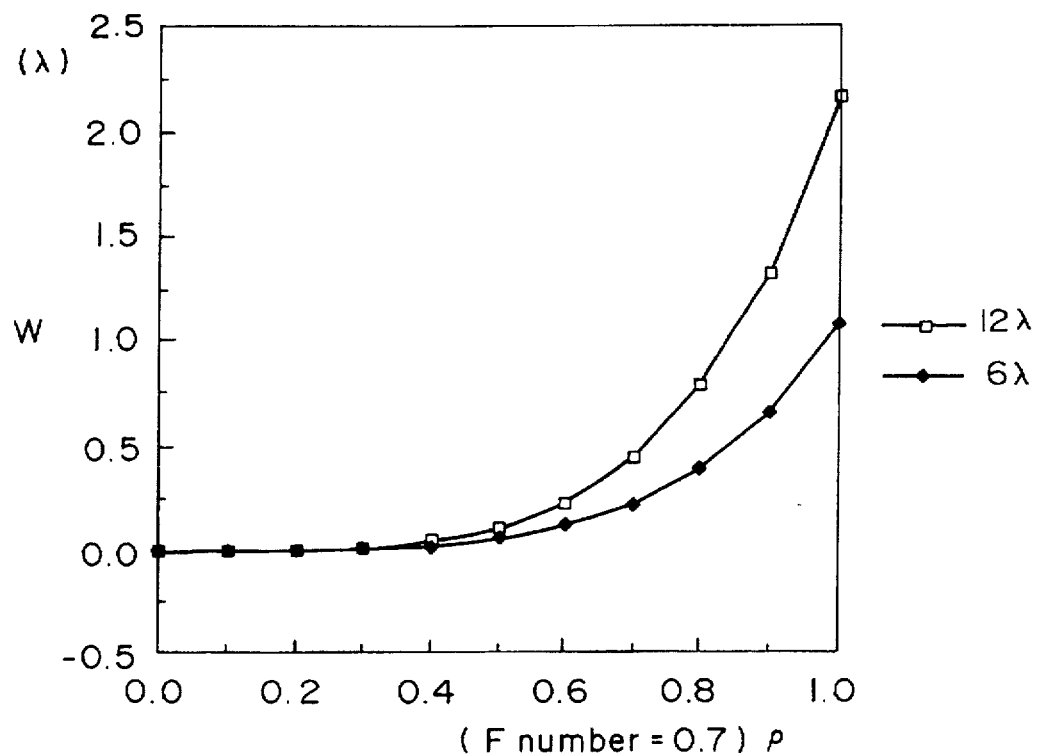
FIG. 14 is a graph showing a relationship between wave front aberrations and a height of an incident light ray under predetermined defocus conditions using the standard lens shown in FIG. 10.
Figure 15:
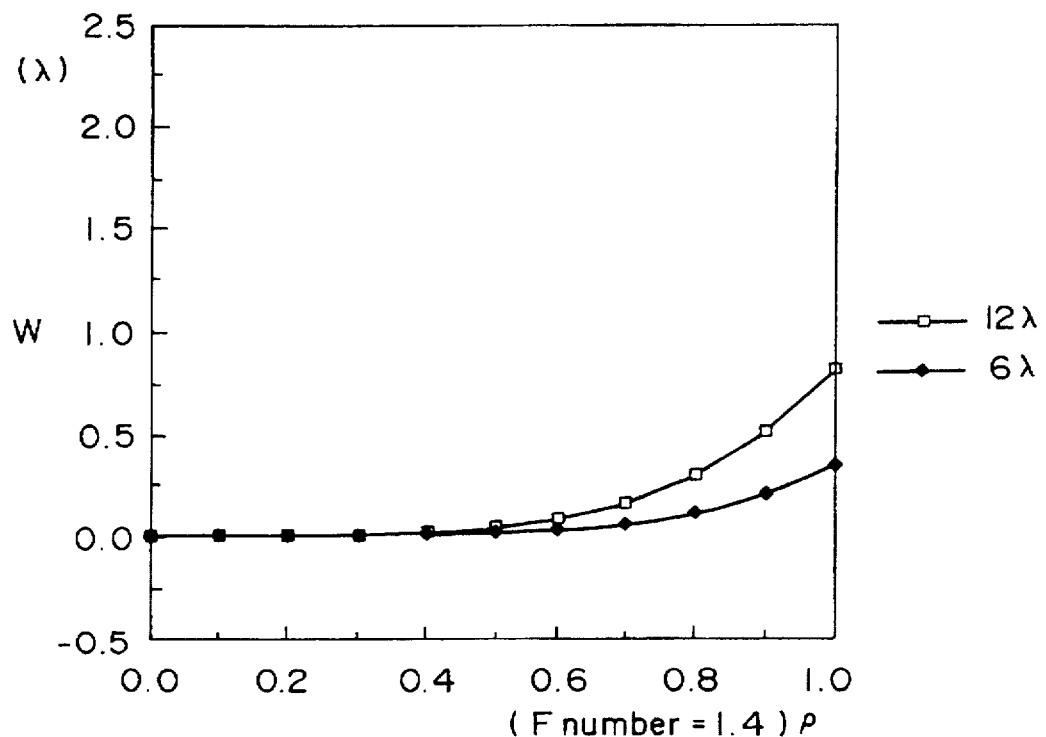
FIG. 15 is a graph showing a relationship between wave front aberrations and a height of an incident light ray under predetermined defocus conditions using the standard lens shown in FIG. 11.

FIGS. 14 and 15 show the relationship between the wave front aberration W and the normalized height ρ of incident light rays that are analyzed by a ray tracing method, under the conditions that the defocus Δz is equal to six times the wavelength λ of the light source (6λ), and twelve times the wavelength (12λ). The axial coordinates are the same as those of FIG. 6.

Aberrations corresponding to even order terms higher than the second order term, such as spherical aberrations, are shown in the FIGS. 14 and 15. These aberrations do not include the main defocus term $W_{20}\rho^2$.

FIG. 14 shows the result using the aplanatic converging lens 7c, while FIG. 15 shows the result using the converging lens 7d that substantially satisfies the sine condition. These results show that the effects of the defocus on these higher even order terms increases according to an increase in the numerical aperture NA of the converging lenses 7c and 7d. The fourth and higher order even terms increase in proportion to the defocus $\Delta z$ when the numerical aperture NA remains constant.

Moreover, a lens having a relatively small numrical aperture NA does not perfectly satisfy the sine condition. Therefore, the effect on the higher order even terms is less than for an aplanatic lens having a relatively large numerical aperture NA.

The first method to correct the wave front aberration measurements according to the present invention will be described below. Initially, the principle of the first method will be described.

When the standard lens 7 is aplanatic, the wave front aberration Wc due to the defocus amount $\Delta z$ is expressed by the following equation (2);

$$Wc = \frac{(1 - \cos\theta) \cdot \Delta z}{\lambda} \qquad (2)$$

where, $\lambda$:wavelength of the light.

Equation (3) is a Taylor series expansion of equation (2) assuming $\sin \phi = NA = h/f$;

$$Wc = \frac{1}{\lambda} \cdot \left( \frac{1}{2} \cdot NA^2 + \frac{1}{8} \cdot NA^4 + \frac{1}{16} \cdot NA^6 + \ldots \right) \cdot \Delta z \qquad (3)$$

The first term of equation (3) represents the second order component of the wave front aberration due to the defocus and corresponds to the third term $W_{20}\rho^2$ of equation (1). Therefore, the coefficient $W_{20}$ can be expressed by the equation (4) below, when the numerical aperture of the standard lens 7 is defined as $NA_0$.

$$W_{20} = \frac{1}{2\lambda} \cdot NA_0^2 \cdot \Delta z \qquad (4)$$

Therefore, the defocus $\Delta z$ can be expressed by equation (5) below.

$$\Delta z = 2 \cdot \lambda \cdot \frac{W_{20}}{NA_0^2} \qquad (5)$$

The other terms ot equation (3) represent the terms, higher than the second order term, corresponding to components of the wave front aberration due to the defocus. Further, these components correspond to the higher than second order term included in equation (1).

The defocus $\Delta z$ can be obtained from equation (5) by substituting the coefficient $W_{20}$ obtained from equation (1), and $NA_0$.

The aberrations due to the defocus corresponding to the higher than second order terms are obtained by substituting the obtained defocus $\Delta z$ in the terms of equation (3), except for the fist term.

Since these higher order terms represent the correction data of the corresponding aberrations due to the defocus, accurate measurement data is obtained by subtracting the correction data from the original measurement data that is analyzed using equation (1).

For example, the fourth order aberration due to defocus can be obtained by substituting the equation (5) for the second term of equation (3), with the obtained fourth order aberration defined as the correction data. The fourth order corrected value A4 is obtained by subtracting correction data from $W_{40}$ according to equation (6) below.

$$A_4 = W_{40} - \frac{1}{8\lambda} \cdot NA_0^4 \cdot \Delta z \qquad (6)$$

$$= W_{40} - \frac{1}{4} \cdot NA_0^2 \cdot W_{20}$$

In the same manner, the sixth order aberration due to defocus can be obtained by substituting equation (5) into the third term of equation (3), with the obtained sixth order aberration defined as the correction data. The sixth order corrected value A6 is obtained by subtracting correction data from W60 according to equation (7) below.

$$A_6 = W_{60} - \frac{1}{16\lambda} \cdot NA_0^6 \cdot \Delta z \qquad (7)$$

$$= W_{60} - \frac{1}{8} \cdot NA_0^4 \cdot W_{20}$$

Similarly, the eighth and higher order even terms can be corrected by subtracting the detected values of the polynomials from the data analyzed according to equation (1).

As described above, the first method of the present invention corrects the fourth and higher order even terms by using the second order coefficient $W_{20}$.

The highest order term wich needs to be corrected depends upon the numerical aperture NA of the standard lens 7.

Figure 16:
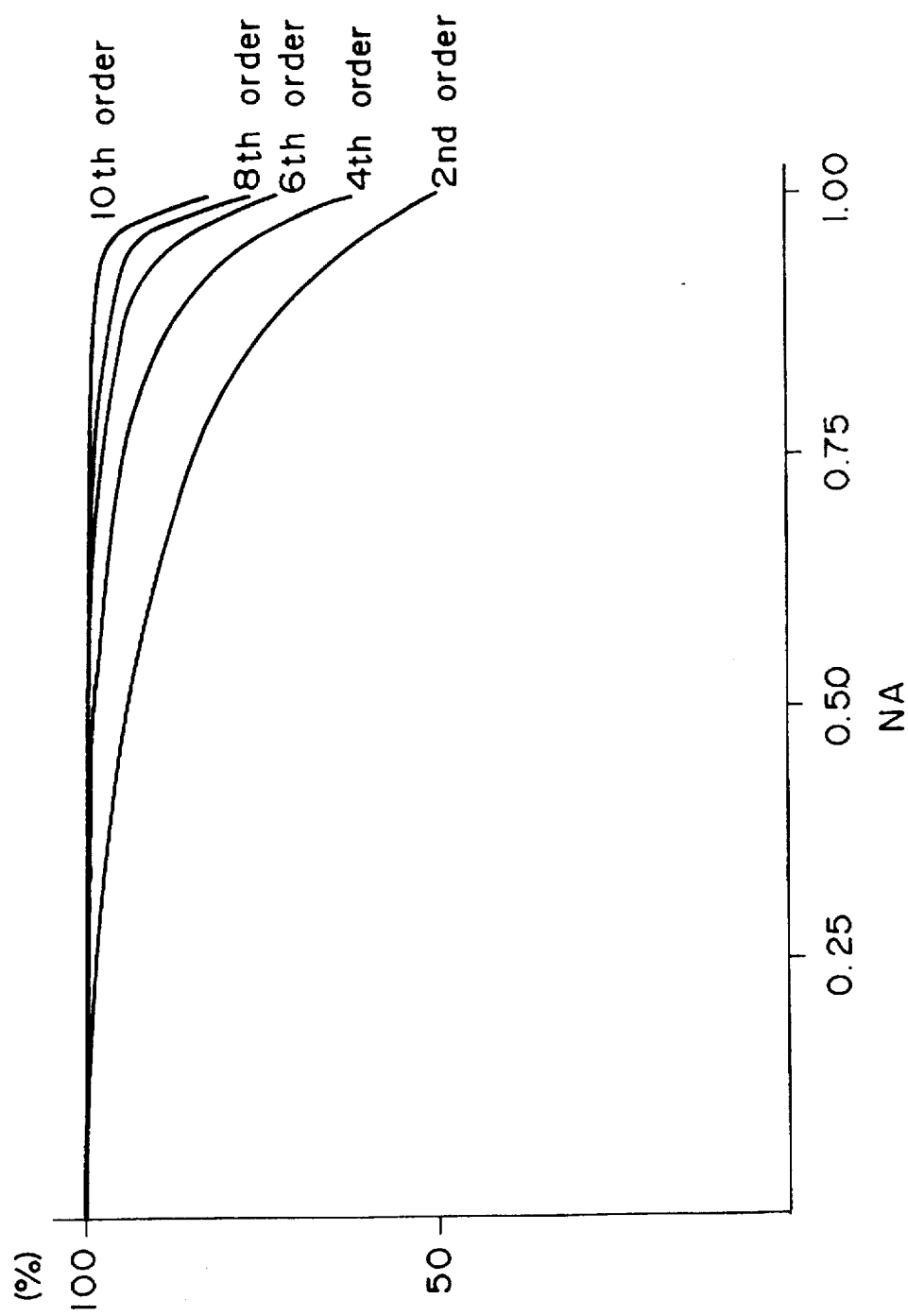
FIG. 16 is a graph showing a relationship between accuracy of measurement results and values of numerical aperture. using different orders of approximation of a wave aberration equation.

FIG. 16 show the relationship between the numerical aperture NA of the standard lens 7, and the accuracy of the corrected wave front aberrations, for different orders of corrected polynomial expansion terms. The accuracy is found by dividing the wave front aberration corrected using the first method described above, by an actual wave front aberration. When only a second order polynomial term is corrected, the corrected value is 50% of the actual value for a lens having an NA of 1.0. The higher the order number, the more accurate the correction of the wave front aberrations. Table 1 shows the relationship between the NA and the order of the term (i.e., order approximation) which must be corrected if the allowable approximation error is 2%.

TABLE 1

| | |
|---|---|
| Second order approximation | NA ≦ 0.3 |
| Fourth order approximation | 0.3 < NA ≦ 0.6 |
| Sixth order approximation | 0.6 < NA ≦ 0.75 |
| Eighth order approximation | 0.75 < NA ≦ 0.82 |
| Tenth order approximation | 0.82 < NA ≦ 0.87 |
| Twelfth order approximation | 0.87 < NA ≦ 0.9 |

The second order approximation is sufficient when the numerical aperture NA is lower than about 0.3. However, when the numerical aperture NA become larger than 0.3, the aberrations corresponding to the fourth order and higher terms cannot be disregarded, and therefore, the fourth order or higher approximations are necessary in order to have an accurate measurement.

Figure 17:
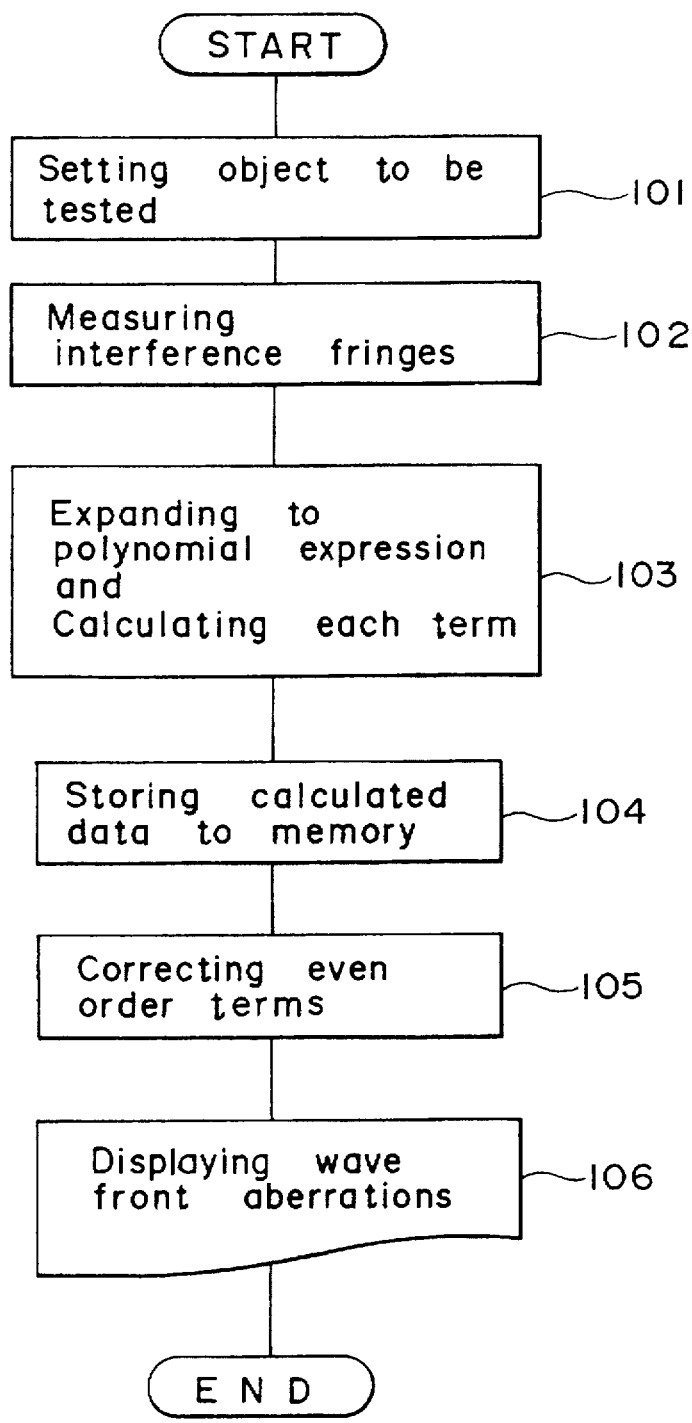
FIG. 17 is a flow chart showing a first method of measurement for correcting effects of defocus. according to the present invention.

The first method of the present invention is described below with reference to the flowchart shown in FIG. 17. The fourth and sixth order aberrations are corrected in this example.

In step 101, an operator sets the object 8 to be tested on the measurement device. Then in step 102, the light source 3 is turned ON to start a measurement. Interf erence fringe patterns are formed on the image receiving element 17.

The output signal from the image receiving device 17 is processed by the image processing device 12 and converted to a digital signal. Then, in step 103 the calculating device 13 analyzes the interference fringe pattern data and expands equation (1) to the sixth order polynomial equation to calculate the values of $W_{11}$, $W_{12}$, $W_{20}$, $W_{22}$, $W_{31}$, $W_{32}$, $W_{40}$, $W_{51}$, $W_{52}$, and $W_{60}$. These values are then stored in memory 15 in step 104 as original measurement data.

In step 105, the calculating device 13 determines the fourth order correction value A4 and the sixth order correction value A6 using the equations (6) and (7) by substituting the value $W_{20}$ obtained in step 104 and the numerical aperture NA0 . . . The odd order terms are not corrected in the first method.

Then, in step 106, the correction values A4 and A6 of the aberration that are equal to the original values without defocus are displayed on the monitor 14 or printed out.

Next, the second method according to the present invention will be described. The first method is effective if the standard lens 7 substantially satisfies the sine condition. However, the second method can be applied if the standard lens 7 does not satisfy the sine condition.

The second method comprises a calibration stage and a measurement stage. The calibration stage measures a reference object two or more times and determines the effects of defocus and/or tilt, and stores the result in a memory as correcting data. The measurement stage measures a test object and corrects the detected wave front aberrations based upon the correcting data.

The compensation of error in the aberration data due to defocus will be described below.

Figure 18:
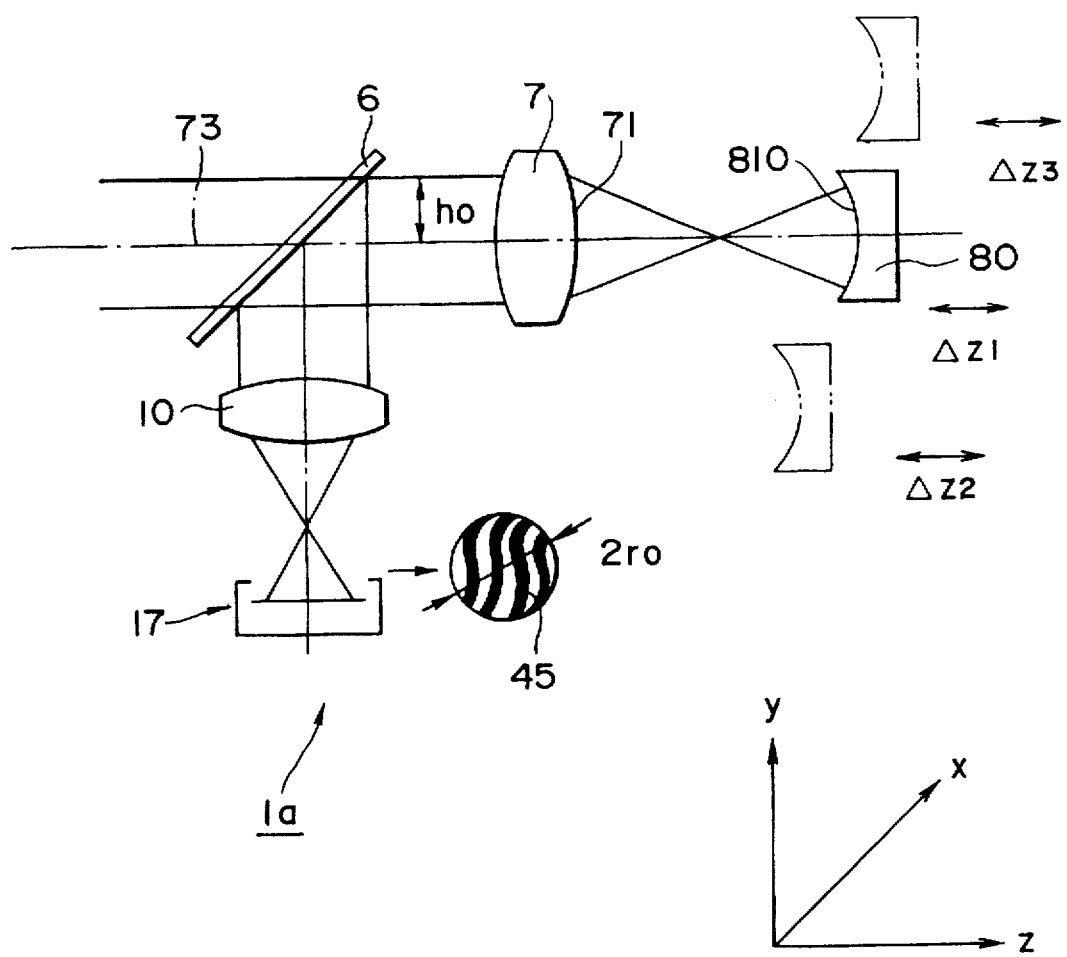
FIG. 18 shows a part of the interferometer of FIG. 1 during a calibration stage of a second method of measurement of the present invention.

As shown in FIG. 18, during the calibration stage, a reference object 80 having surface 810 which has no aberrations, is placed in the position where the object 8 is to be tested, as is shown in FIG. 1.

The interference fringe pattern 45 is formed on the image receiving device 17 by superimposing the reference light beam reflected by the reference surface 71 of the standard lens 7 and the testing light beam reflected from the surface 810 of the reference object 80.

The interference fringe pattern 45 is measured two or more times for different defocus conditions. The interference fringe pattern data is analyzed and the wave front aberration data is expanded to give the polynomial expression given by equation (1) to determine the coefficients $W_{11}$, $W_{12}$, $W_{20}$, $W_{22}$, $W_{31}$, $W_{32}$, $W_{40}$, $W_{51}$, $W_{52}$, and $W_{60}$ using the least squares method.

$$W(\rho,\phi) = \sum_{n=0}^{k}\sum_{l=0}^{n} W_{nl}\rho^n \cos^l \phi \quad (1)$$

$$= W_{11}\rho \sin\phi + W_{12}\rho \cos\phi + W_{20}\rho^2 +$$

$$W_{22}\rho^2 \cos^2\phi + W_{31}\rho^3 \cos\phi +$$

$$W_{32}\rho^3 \sin\phi + W_{40}\rho^4 + W_{51}\rho^3 \cos\phi +$$

$$W_{52}\rho^3 \sin\phi + W_{60}\rho^6 + \ldots$$

For example, the defocus is made $\Delta z_1$, $\Delta z_2$ and $\Delta z_3$ by varying the position or the reference object 80 along the optical axis 73. The interference fringe patterns is then measured and the coefficients are determined for each defocus condition.

A height $h_0$ shown in FIG. 18 denotes a height of the light beam incident on the standard lens 7, while a radius $r_0$ denotes a radius of the interference fringe pattern.

The relationship between the coefficient of the defocus term $W_{20}$ and the coefficients of the other even order terms $W_{40}$ and $W_{60}$ is determined by using some sets of values (i.e., $W_{20}$, $W_{40}$, $W_{60}$) detected by the measurements.

The relationship is determined by a function using the least squares method as follows:

$$W_{40}=f_1(W_{20}), W_{60}=f_2(W_{20})$$

Figure 19:
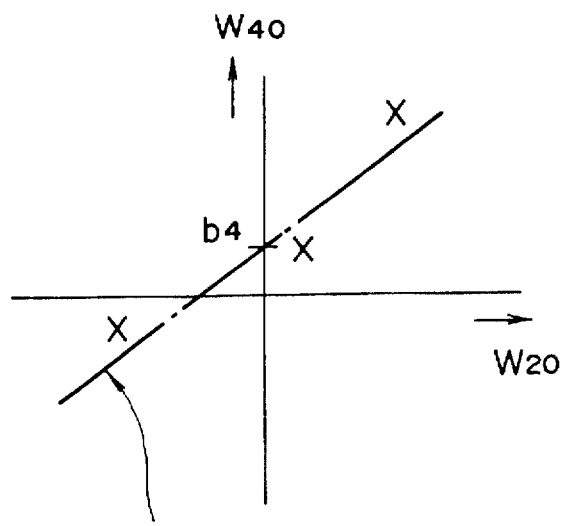
FIGS. 19 and 20 are graphs showing an approximate expression for different coefficients of the wave aberration equation.
Figure 20:
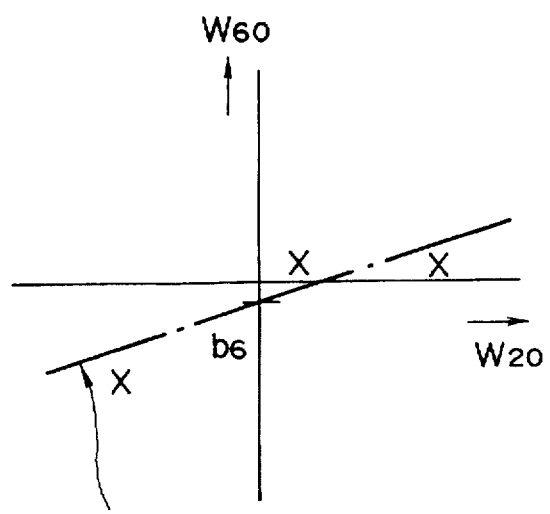

The relationships are expressed by the approximate expressions shown in FIGS. 19 and 20, and can be expressed by the following first order functions (8) and (9).

$$W_{40}=a_4 W_{20}+b_4 \quad (8)$$

where, $a_4$, $b_4$ are coefficients of correction.

$$W_{60}=a_6 W_{20}+b_6 \quad (9)$$

where, $a_6$, $b_6$ are coefficients of correction.

By performing at least two measurements of the reference object 80, the coefficients of correction $a_4$, $b_4$, $a_6$, and $b_6$ can be determined.

The calculating device 13 stores the value of these coefficients of correction in the memory 15 for use as correction data in the following measurement stage. Furthermore, since the reference object 80 has no aberration, the coefficients of aberration $b_4$ and $b_6$ are due only to the interferometer $1a$ and can therefore be corrected by a known method such as Bruning's method.

However, when the object 8 that has aberrations is placed under test, the coefficients $b_4$ and $b_6$ include the coefficients of aberrations $\alpha_4$, $\alpha_6$ of the interferometer $1a$ and the coefficients of aberrations $\beta_4$, $\beta_6$ of the object 8 as shown in equations (10) and (11).

$$b_4=\alpha_4+\beta_4 \quad (10)$$

$$b_6=\alpha_6+\beta_6 \quad (11)$$

Figure 21:
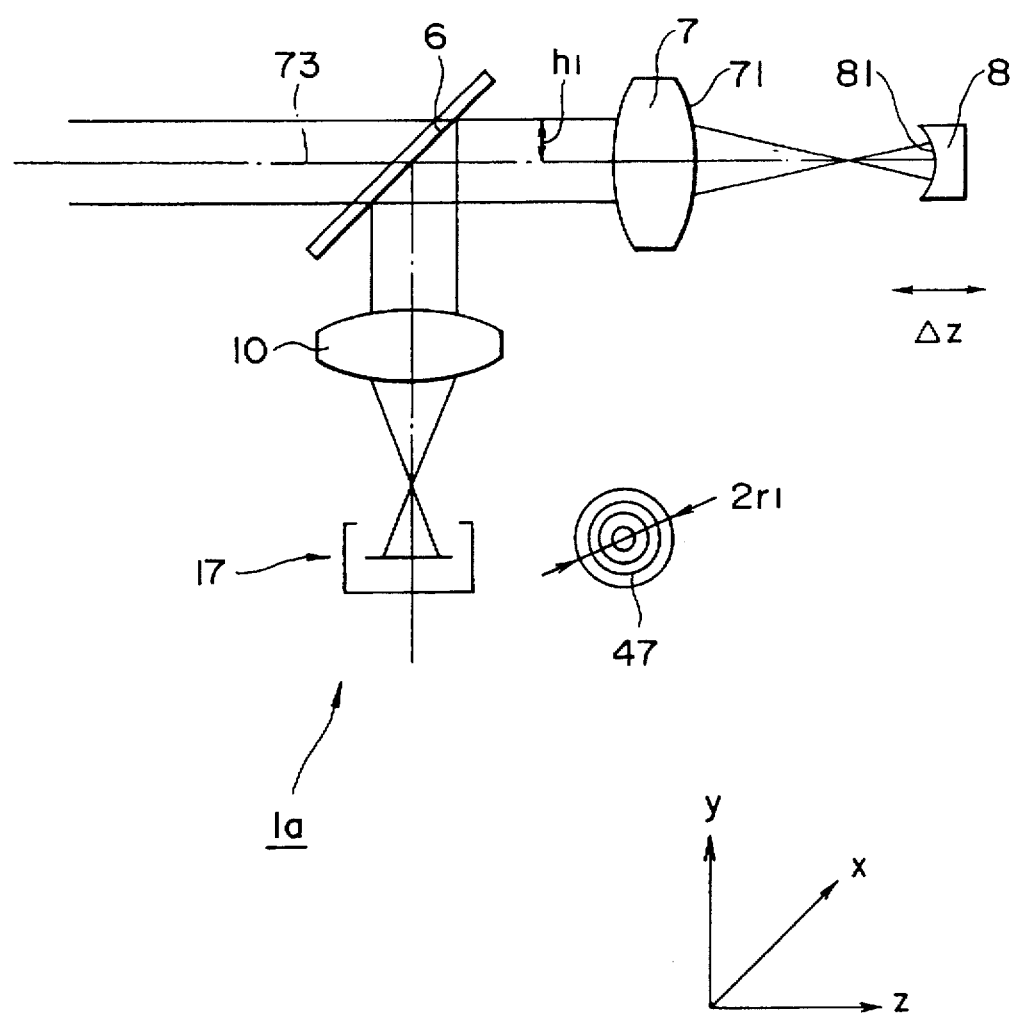
FIG. 21 shows a part of the interferometer of FIG. 1 during a measurement stage according to the second method of measurement of the present invention.

In the measurement stage, the object 8 is placed under test as shown in FIG. 21. Then, the interference fringe patterns is formed on the image receiving device 17 by superimposing the reference light beam and a testing light beam reflected by the surface 81 of the object 8. The height $^h1$ denotes a height of the light beam incident on the standard lens 7 and the radius $^r1$ denotes a radius of the interference fringe image 47 in the measurement stage. The ratio s is determined by the following equation (12).

$$s = \frac{r_1}{r_0} = \frac{h_1}{h_0} \quad (12)$$

The calculating device 13 expands the wave front aberrations expression shown in equation (1) to the polynomial expression as the equation (1) and then uses the least squares method to determine the coefficients $W_{11}'$, $W_{12}'$, $W_{20}'$, $W_{22}'$, $W_{31}'$, $W_{32}'$, $W_{40}'$, $W_{51}'$, $W_{52}'$, and $W_{60}'$. These coefficients represent original measurement values of the object under test.

Symbols C, D and E are defined as values of the second, fourth and sixth order aberration coefficients when the incident light beam height is equal to $^h1$. The relationship between the values of C, D and E and $W_{20}'$, $W_{40}'$, $W_{60}'$ which are determined when the incident light beam height is equal to $h_0$, are represented by the equations (13), (14) and (15) below.

$$C=W_{20}'s^2 \quad (13)$$

$$D=W_{40}'s^4 \quad (14)$$

$$E=W_{60}'s^6 \quad (15)$$

The coefficients $W_{40}'$ and $W_{60}'$ can be expressed by $W_{20}'$ as shown in equations (8) and (9). Further, by substituting the value of C in the equations 14 and 15, the values of D and E can be given by equations (16) and (17) below.

$$\begin{aligned} D &= W_{40}'s^4 \quad (16) \\ &= (a_4 W_{20}' + b_4)s^4 \\ &= \left(a_4 \frac{C}{s^2} + b_4\right)s^4 \\ &= a_4 s^2 C + b_4 s^4 \end{aligned}$$

-continued $$E = W_{60}'s^6 \qquad (17)$$
$$= (a_6 W_{20}' + b_6)s^6$$
$$= \left(a_6 \frac{C}{s^2} + b_6\right) s^6$$
$$= a_6 s^4 C + b_6 s^6$$

Therefore, equation (16) shows the coefficient of the fourth order aberration due to the defocus and the interferometer $1a$. Further, equation (16) represents the correction value of the fourth order aberration. Similarly, equation (17) shows the coefficient of the sixth order aberration due to the defocus and the interferometer $1a$. Further, equation (17) represents the correction value of the sixth order aberration.

The calculating device 13 subtracts the correction values obtained by equations (16) and (17) from the original measurement values $W_{20}'$, $W_{40}'$ and $W_{60}'$ to obtain accurate corrected values $W_{40}''$ and $W_{60}''$ of the fourth and sixth order aberrations, as shown by the equations (18) and (19).

$$W_{40}''=W_{40}'-(a_4 s^2 W_{20}'+b_4 s^4) \qquad (18)$$

$$W_{60}''=W_{60}'-(a_6 s^4 W_{20}'+b_6 s^6) \qquad (19)$$

The higher order even aberrations can be corrected in a similar way as mentioned above. Equation (20) is a generalized equation to correct the even order aberration due to the defocus.

$$W_{n0}''=W_{n0}'-(a_n s^{n-2} W_{20}'+b_n s^n) \qquad (20)$$

Where, $W_{n0}''$: N-th order measured corrected result;

$W_{n0}'$, $W_{20}'$: Coefficients when under test;

$a_n$, $b_n$: Coefficients of Correction $n$: Even number greater than or equal to 4. The present invention can correct the effect of the defocus on the fourth and higher order even aberrations during the measurement stage, based on the correcting function that is determined in the calibration stage.

As mentioned above, the effect of the defocus increases as the numerical aperture NA increases. Therefore, the numerical aperture should be considered when determining the aberration order necessary to be corrected. In general, enough accuracy can be obtained when the fourth and sixth order aberrations are corrected.

The above description mentioned the correction of the even order aberrations which are affected by defocus. However, the odd order aberrations, such as the third order and fifth order terms of equation (1), which are affected by the tilt, can also be corrected.

In the following description, the method for removing the effect of the tilt $\Delta x$ is described. However, the effect of the tilt $\Delta y$ can be also removed by the same steps except that the direction must be changed.

In the calibration stage, the interference fringe pattern 45 is measured two or more times under different tilt $\Delta x$ conditions. The interference fringe pattern data is analyzed and the wave front aberration expression is expanded to the polynomial expression as shown by equation (1) to determine the coefficients $W_{11}$, $W_{12}$, $W_{20}$, $W_{22}$, $W_{31}$, $W_{32}$, $W_{40}$, $W_{51}$, $W_{52}$, $W_{60}$ using the least squares method. These coefficients are then stored as calibration measurement data.

The relationship between the coefficient $W_{11}$ of the tilt term and the coefficients $W_{31}$ and $W_{51}$ of the other odd aberration terms is determined by using some sets of values (i.e., $W_{11}$, $W_{31}$, $W_{51}$) detected by the measurements.

The relationship is determined by a function using the least squares method, and can be expressed using the following first order functions (21) and (22).

$$W_{31}=a_3 W_{11}+b_3 \qquad (21)$$

where, $a_3$, $b_3$: coefficients of correction.

$$W_{51}=a_5 W_{11}+b_5 \qquad (22)$$

where, $a_5$, $b_5$ coefficients of correction.

By performing at least two measurements of the reference object 80, the coefficients of correction $a_3$, $b_3$, $a_5$, and $b_5$ can be determined.

The calculating device 13 stores the value of these coefficients of correction in the memory 15 for use as correction data in the following measurement stage. Further as described for the defocus measurement case, the coefficients $b_3$ and $b_5$ can be expanded as shown below.

$$b_3=\alpha_3+\beta_3 \qquad (23)$$

$$b_5=\alpha_5+\beta \qquad (24)$$

When the object 8 is placed under test, as described above, the calculating device 13 expands the wave front aberrations to give the polynomial expression given by equation (1) to determine the coefficients $W_{11}'$, $W_{12}'$, $W_{20}'$, $W_{22}'$, $W_{31}'$, $W_{32}'$, $W_{40}'$, $W_{51}'$, $W_{52}'$, and $W_{60}'$ using the least squares method. These values are then stored as original measurement values of the object 8 under test.

Symbols G, H and I are defined as values of the first, third and fifth order aberration coefficients when the incident light beam height is equal to $h_1$. The relationship between the values of G, H and I and $W_{11}'W_{31}'$, $W_{51}'$ that are values determined when the incident light beam height is equal to $h_0$, are represented by the equations (25), (26) and (27) given below.

$$G=W_{11}'s \qquad (25)$$

$$H=W_{31}'s^3 \qquad (26)$$

$$I=W_{51}'s^5 \qquad (27)$$

The coefficients $W_{31}'$ and $W_{51}'$ can be expressed in terms of $W_{11}'$ as shown in the equations (21) and (22). Further, by substituted the value of G in the equations (26) and (27) the values of H and I can be given by equations (28) and (29) below.

$$H = W_{31}'s^3 \qquad (28)$$
$$= (a_3 W_{11}' + b_3)s^3$$
$$= \left(a_3 \frac{G}{s} + b_3\right) s^3$$
$$= a_3 s^2 G + b_3 s^3$$

$$I = W_{51}'s^5 \qquad (29)$$
$$= (a_5 W_{11}' + b_5)s^5$$
$$= \left(a_5 \frac{G}{s} + b_5\right) s^5$$
$$= a_5 s^4 G + b_5 s^5$$

Therefore, equation (28) shows the coefficient of the third order aberration due to the tilt and the interferometer $1a$. Further, equation (28) represents the correction value of the third order aberration. Similarly, equation (29) shows the coefficient of the fifth order aberration due to the tilt and the interferometer 1a. Further, equation (29) represents the correction value of the fifth order aberration.

The calculating device 13 subtracts the correction values obtained by the equations (28) and (29) from original measurement values $W_{11}'$, $W_{31}'$ and $W_{51}'$, to obtain accurate corrected values $W_{31}''$, and $W_{51}''$ of the third and fifth order aberrations, as shown by equations (30) and (31).

$$W_{31}''=W_{31}'-(a_3 s^2 W_{11}'+b_3 s^3) \qquad (30)$$

$$W_{51}''=W_{51}'-(a_5 s^4 W_{11}'+b_5 s^5) \qquad (31)$$

The higher order odd aberrations can be corrected in a similar way as mentioned above. Equation (32) is a generalized equation for correcting the odd order aberrations due to the tilt.

$$W_{nm}''=W_{nm}'-(a_{nm} s^{n-1} W_{lm}'+b_{nm} s^n) \qquad (32)$$

Figure 22:
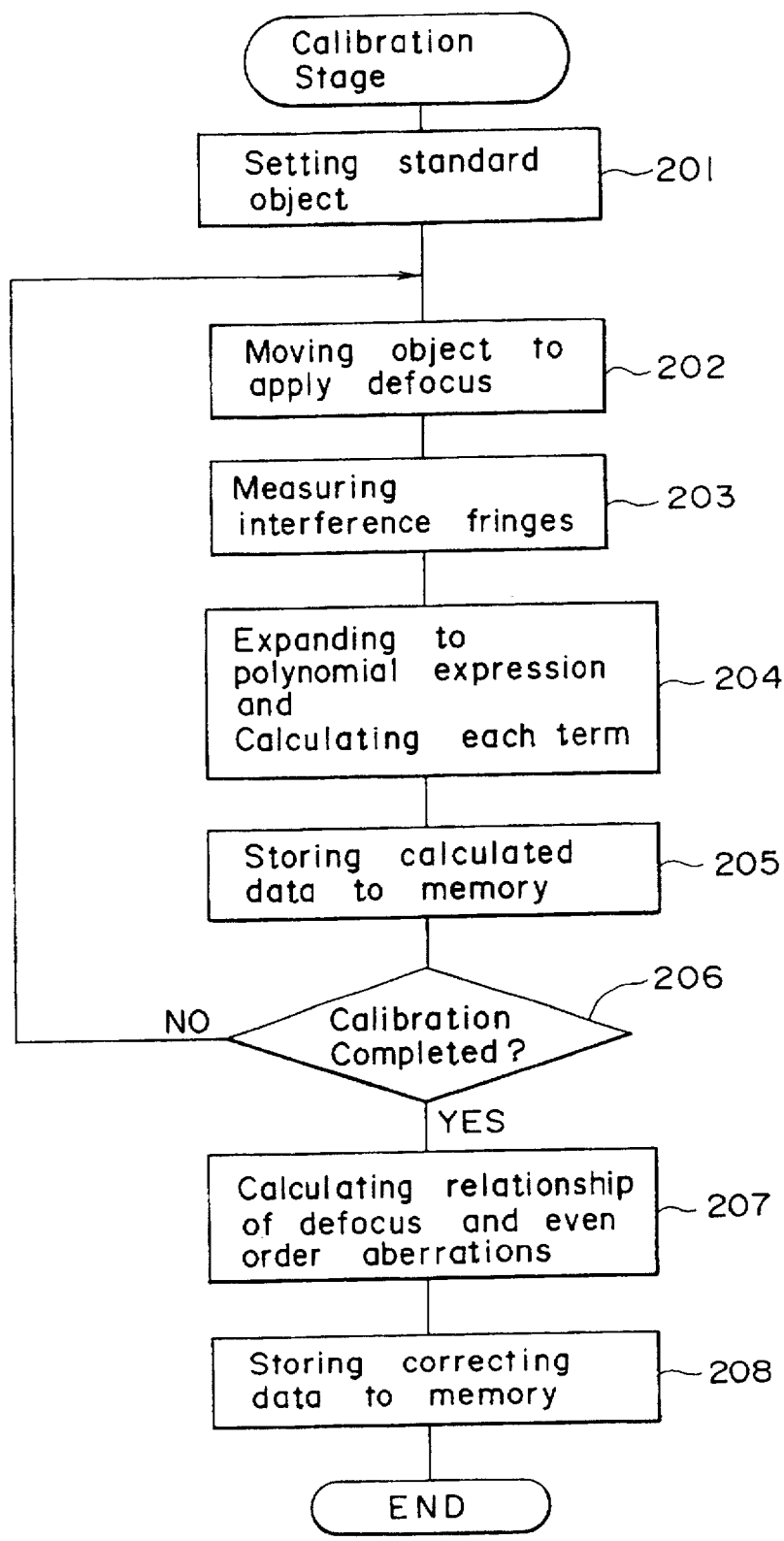
FIGS. 22 and 23 show a flowchart of an operation to correct for defocus. according to the second method of measuremnt of the present invention.
Figure 23:
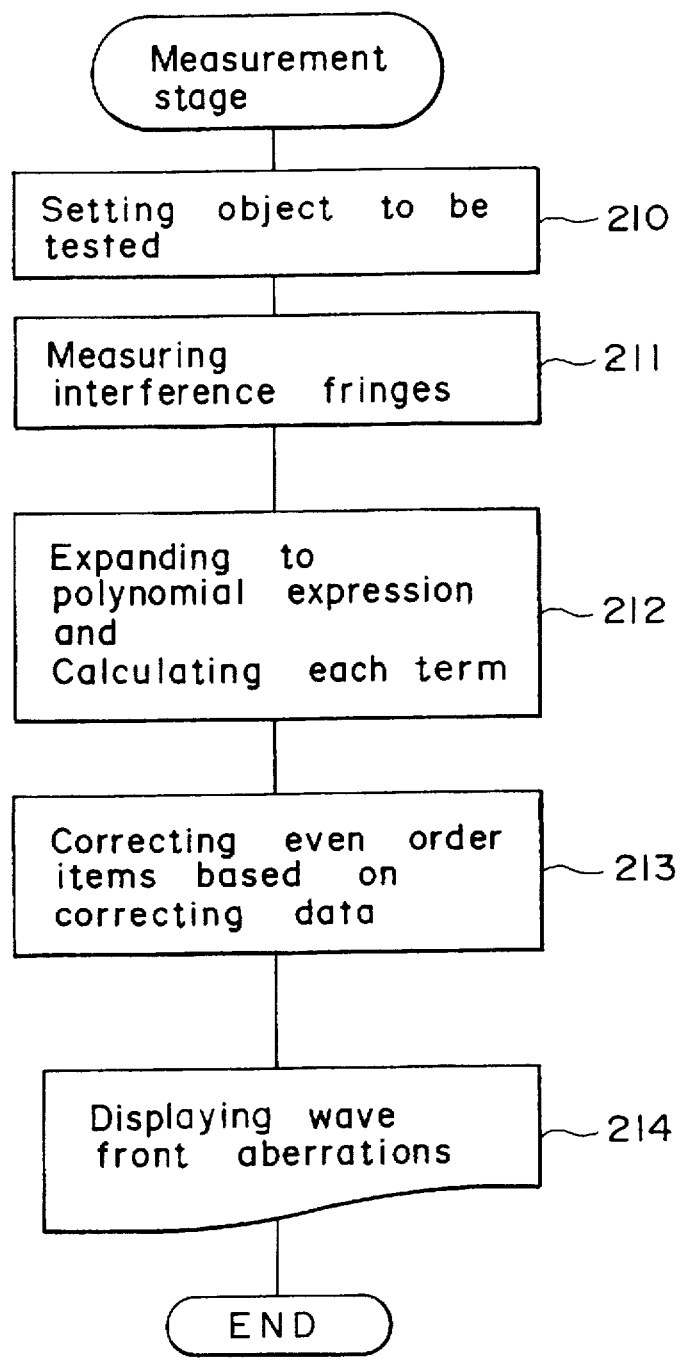
Figure 24:
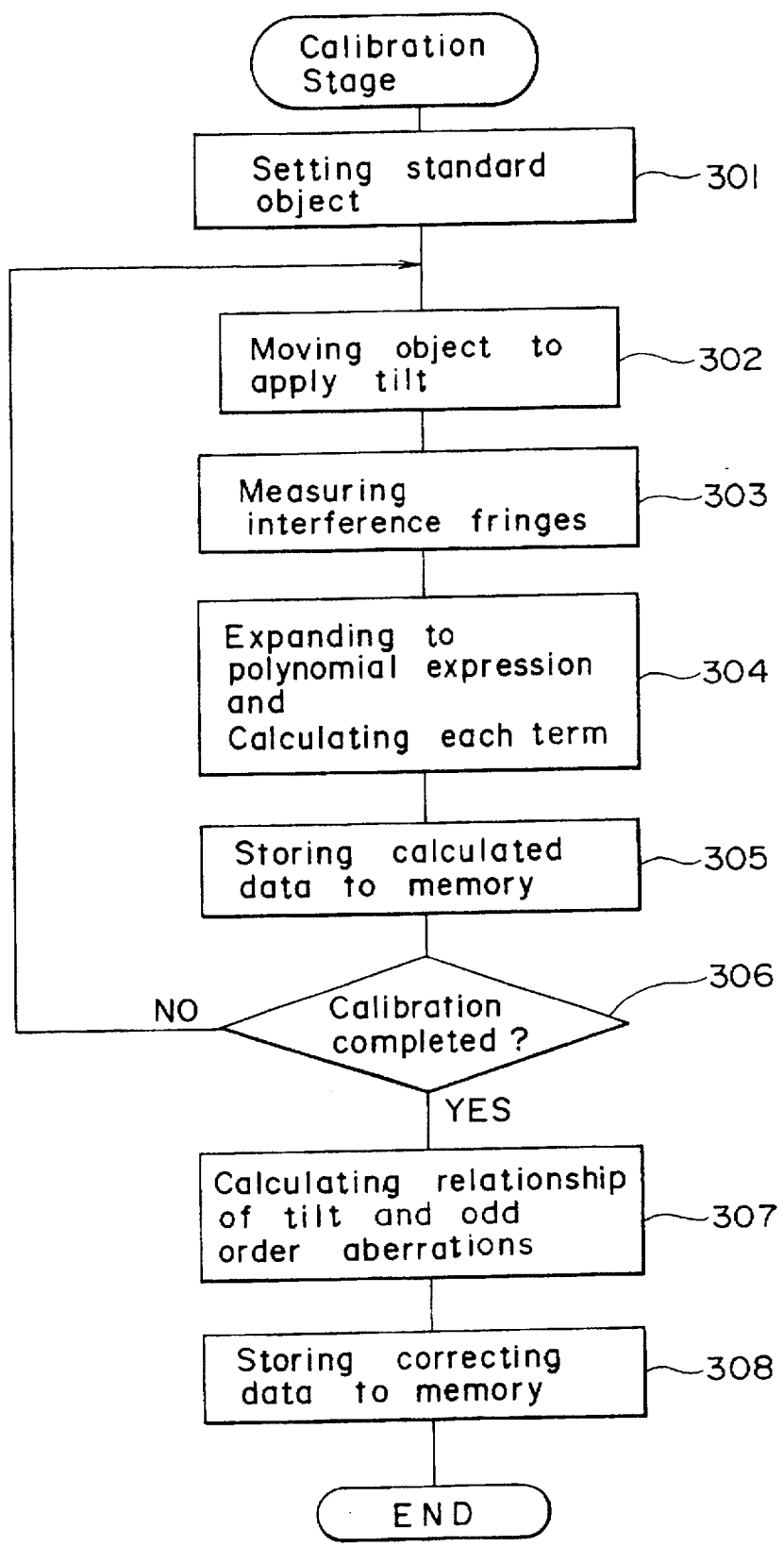
FIGS. 24 and 25 show a flowchart of an operation to correct for tilt. according to the second method of measurement of the present invention.
Figure 25:
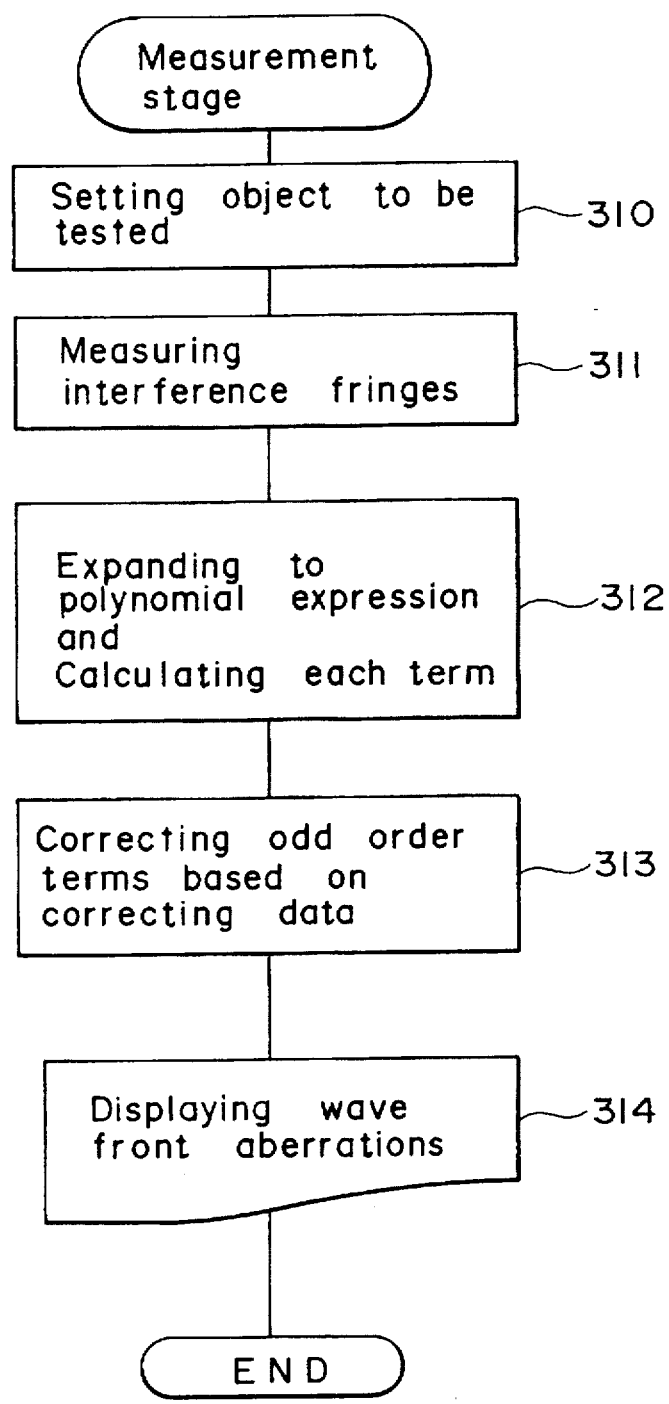

Where, $W_{nm}''$:N-th order measured corrected result;

$W_{nm}'$, $W_{lm}'$:Coefficients when under tenting;

$a_{nm}$, $b_{nm}$:Coefficients of Correction $n$:Odd number greater than or equal to 3;

The second method of the present invention is described below with reference to the flowchart shown in FIGS. 22 through 25. FIGS. 22 and 23 show the method for compensating for the defocus, thereby correcting the fourth and sixth order aberrations. FIGS. 24 and 25 show the method for compensating for the tilt thereby correcting the third and fifth order aberrations.

In step 201 of the flowchart shown in FIG. 22, an operator sets the reference object 80 on the measurement device 1a. Then in step 202, the reference object 80 is moved along the optical axis z direction in order to establish a known defocus condition. The light source 3 is turned ON, the interference fringe pattern is formed on the image receiving element 17, and the measurement of the interference fringe pattern is started in step 203, as described below.

The output signal from the image receiving device 17 is processed by the image processing device 12 and converted to a digital signal. In step 204, the calculating device 13 analyzes the interference fringe pattern data and expands equation (1) to the sixth order polynomial equation to calculate the values of $W_{11}$, $W_{12}$, $W_{20}$, $W_{22}$, $W_{31}$, $W_{32}$, $W_{40}$, $W_{51}$, $W_{52}$, $W_{60}$.

A set of data (i.e., $W_{20}$, $W_{40}$, $W_{60}$) of the calculated values is stored in the memory 15 as calibration data, in step 205.

Steps 202 to 205 are repeated at least twice until the calculating device 13 determines that the calibration is completed in step 206.

In step 207, a plurality of sets of data ($W_{20}$, $W_{40}$, $W_{60}$) are stored, the calculating device 13 finds the relationship between the defocus coefficient $W_{20}$ and the fourth order aberration coefficient $W_{40}$, and the relationship between the defocus coefficient $W_{20}$ and the sixth order aberration coefficient $W_{60}$. The relationships can be expressed in terms of first order equations, such as those shown in equations (8) and (9).

Then, in step 208, the calculating device 13 stores the coefficients $a_4$, $b_4$, $a_6$, $b_6$ of the first order equations in the memory 15 as correction data, to end the calibration stage.

In the measurement stage shown in FIG. 23, an operator sets the object 8 to be tested on the measuring device, in step 210. The object 8 is measured by the measuring device in steps 211 and 212 in the same manner as described for the reference object 80 in steps 203 and 204. The measured data in step 212 is expressed as $W_{11}'$, $W_{12}'$, $W_{20}'$, $W_{22}'$, $W_{31}'$, $W_{32}'$, $W_{40}'$, $W_{51}'$, $W_{52}'$, $W_{60}'$.

In step 213, the calculating device 13 corrects the coefficients $W_{40}'$ and $W_{60}'$ to obtain the corrected data $W_{40}''$ and $W_{60}''$ according to equations (18) and (19), based on the correction data $a_4$, $b_4$, $a_6$, $b_6$ stored in the memory 15, the measured values $W_{20}'$, $W_{40}'$, $W_{60}'$ and the ratio s.

The calculating device 13 displays the values of the coefficients $W_{11}'$, $W_{12}'$, $W_{20}'$, $W_{22}'$, $W_{31}'$, $W_{32}'$, $W_{40}''$, $W_{51}'$, $W_{52}'$, $W_{60}''$ on the display 14 in step 214.

When the second method is used for compensating the wave aberration for the effects of tilt, the process is performed as shown in the flowchart shown in FIGS. 24 and 25. This process is similar to steps 201 through 214 used to compensate the wave aberration for the effects of defocus. In step 302 of the calibration stage, the reference object 80 is moved along the x direction to establish a known tilt condition. Then, in steps 303 through 305, the interference fringe pattern is detected and analyzed, and the calculated data is stored in the memory 15, as described below.

In step 304, the calculating device 13 analyzes the interference fringe pattern data and expands equation (1) to a sixth order polynomial equation to calculate the value of $W_{11}$, $W_{12}$, $W_{20}$, $W_{22}$, $W_{31}$, $W_{32}$, $W_{40}$, $W_{51}$, $W_{52}$, $W_{60}$.

A set of data (i.e., $W_{11}$, $W_{31}$, $W_{51}$) of the calculated values is stored in the memory 15 as calibration data, in step 305.

The process of steps 302 to 305 is repeated at least twice until the calculating device 13 determines that the calibration is completed, in step 306.

Then, in step 307, a plurality of sets of data ($W_{11} W_{31}$, $W_{51}$) are stored, the calculating device 13 finds the relationship between the tilt coefficient $W_{11}$ and the third order aberration coefficient $W_{31}$, and the relationship between the tilt coefficient $W_{11}$ and the fifth order aberration coefficient $W_{51}$. The relationships can be expressed in terms of first order equations, such as those show in equations (21) and (22).

Then, in step 308, the calculating device 13 stores the coefficients $a_3$, $b_3$, $a_5$, $b_5$ of the first order equations in the memory 15 as correction data, to end the calibration stage.

The measurement stage shown in FIG. 25, steps 310 through 314, are similar to steps 210 through 214 shown in FIG. 23. In step 314, the calculating device 13 displays the values of the coefficients $W_{11}'$, $W_{12}'$, $W_{20}'$, $W_{22}'$, $W_{31}''$, $W_{32}'$, $W_{40}'$, $W_{51}''$, $W_{52}'$, $W_{60}'$ on the display 14

Only the tilt in the x direction is considered in the method shown in FIGS. 24 and 25. When the tilt in the y direction is considered, the coefficient of the tilt term is $W_{12}$, and the coefficients of the third and fifth order terms are $W_{32}$ and $W_{52}$, respectively.

Thus, the second method mentioned above determines a first order equation which defines the effects on the wave aberration of the defocus and tilt of the object under test. However, the second method is not limited to compensating the wave aberration data using this method. For example, when compensating for the defocus, it is possible to make a data table based upon the obtained sets of data (i.e., $W_{20}$, $W_{40}$, $W_{60}$) in the calibration stage, and then correct the measurement values $W_{40}$, $W_{60}$ by using the correction data, found from the data table, corresponding to the measured defocus data $W_{20}$.

As described above, the measuring device 1a uses the interferometer 2a to determine whether an object such as a lens or mirror under test has aberrations. By taking into consideration the position errors associated with placing the object under test in the measuring device 1a, a more accurate determination of the aberration of the object under test can be made.

Thus, for example, an interferometer according to the present invention can be used during a manufacturing process to separate lenses or mirrors having surface aberrations above a predetermined threshold level. Further, according to the present invention, the effects of the interferometer on the aberration data can be removed by using the method outlined in the above description, thereby improving the accuracy of the testing procedure.

Figure 26:
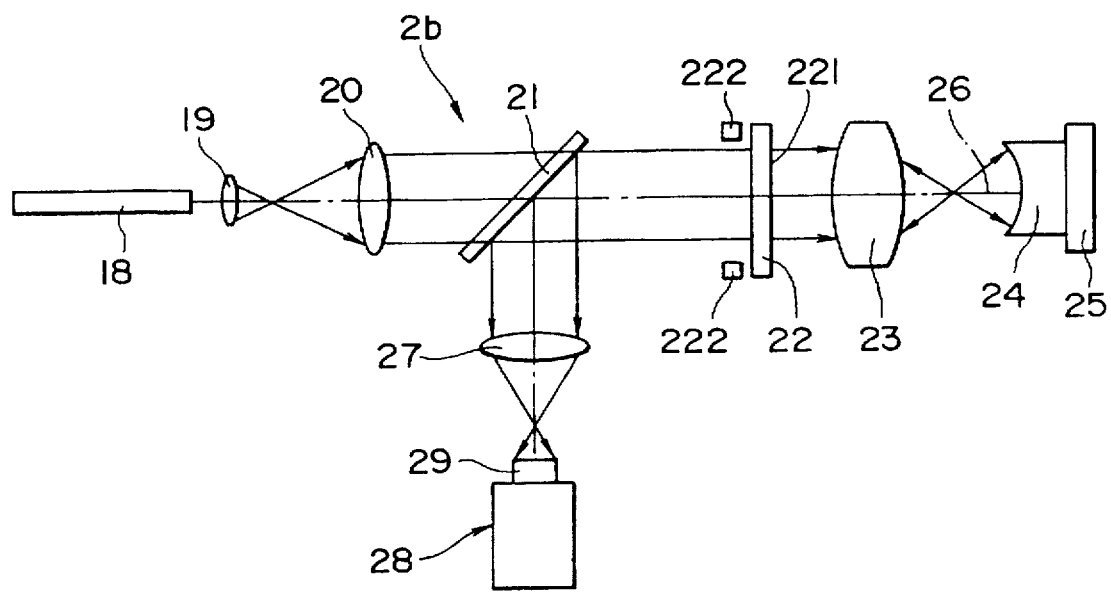
FIG. 26 shows another Fizeau type interferometer that can be used in the present invention.
Figure 27:
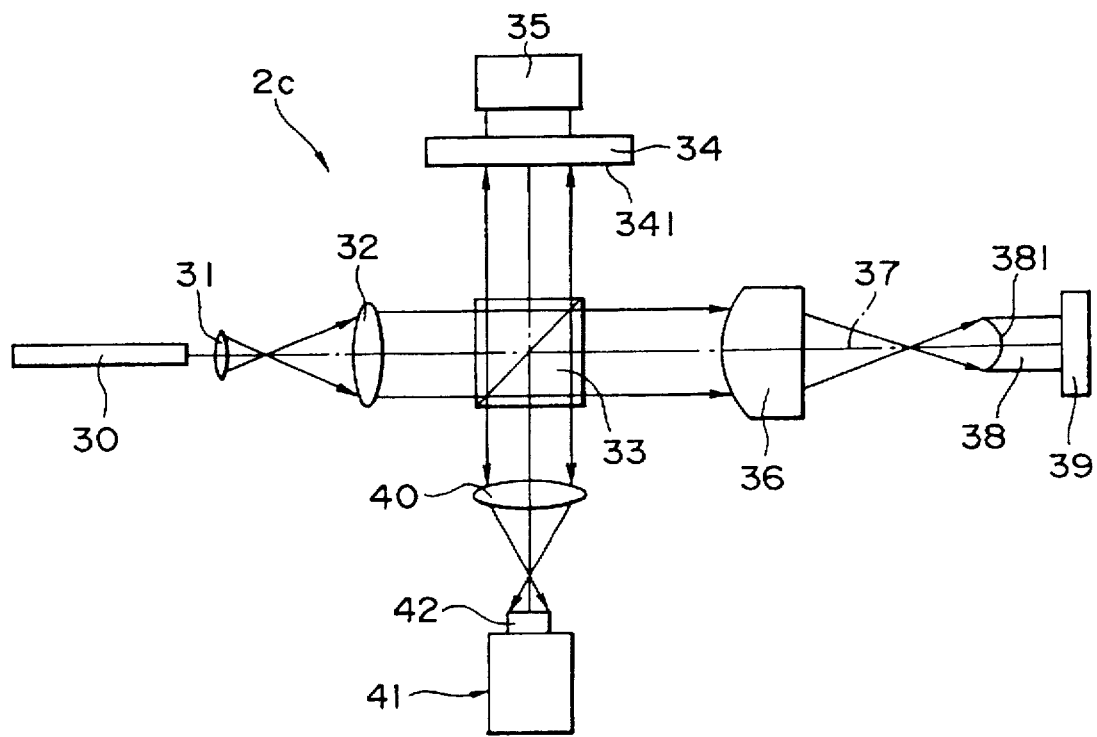
FIG. 27 shows a Twyman-Green type interferometer that can be used in the present invention.
Figure 28:
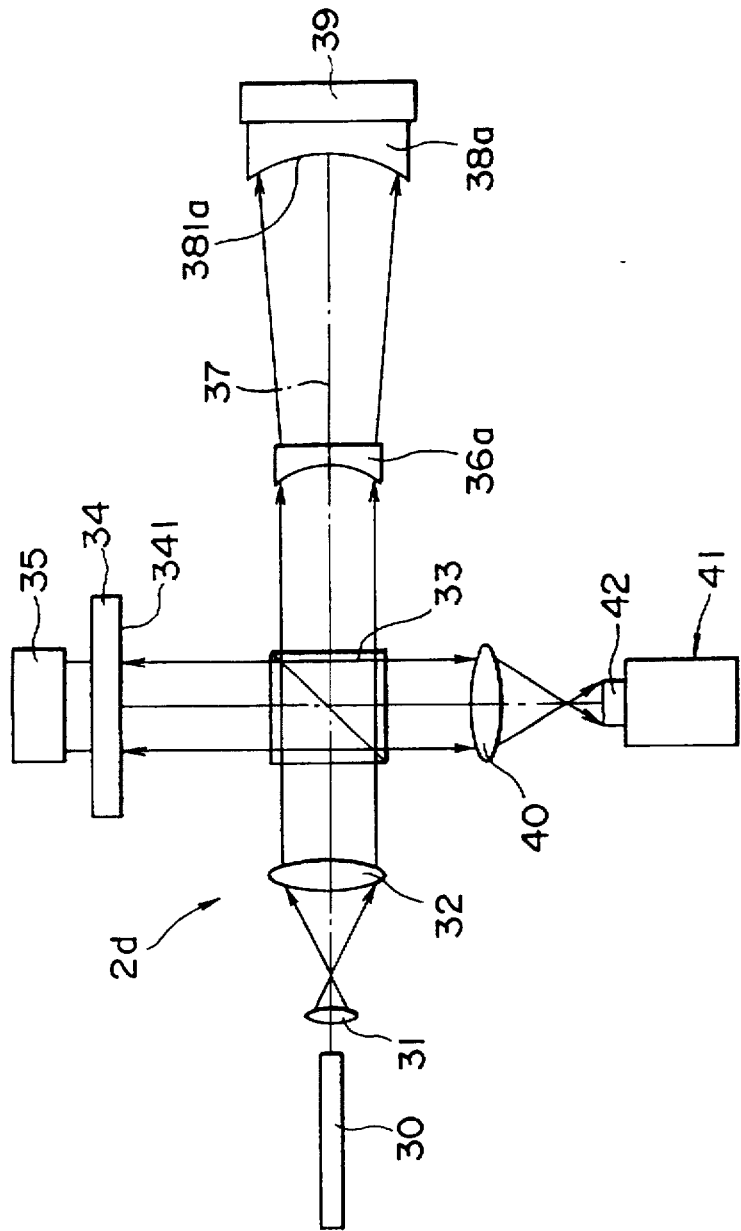
FIG. 28 shows another Twyman-Green type interferometer that can be used in the present invention.
Figure 29:
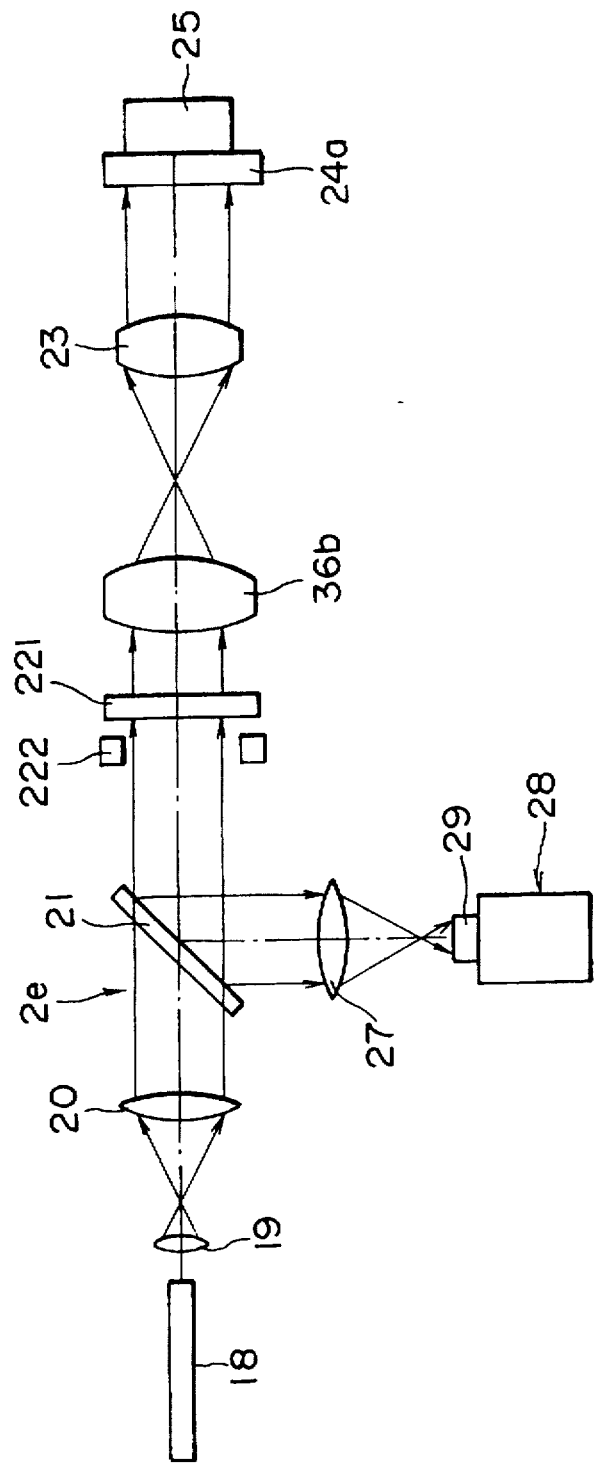
FIG. 29 shows yet another Fizeau type interferometer that can be used in the present invention.

FIGS. 26 to 29 Illustrate other examples of measuring devices 1b, 1c, 1d and 1e, having interferometers 2b, 2c, 2d and 2e respectively. The interferometers 2b, and 2e of FIGS. 26 and 29 are Fizeau types, and are similar to the interferometer 2a shown in FIG. 1. The interferometers 2c and 2d of FIGS. 27 and 28 are Twyman-Green type interferometers. All of these interferometers can be used in both the first and second methods of measurement described above instead of the interferometer 2a shown in FIG. 1.

The interferometer 2b or FIG. 26 measures a wave front aberration of a lens 23 (which is the object under test).

The interferometer 2b comprises a light source 18, a beam expander that has two lenses 19 and 20, a half mirror 21, a reference plane parallel plate 22 that can be driven along an optical axis by a driving device 222 such as a PZT, a concave mirror 24, an observing lens 27 and an image receiving portion 28 that has an imge receiving element 29 such as a CCD device.

The mirror 24 can be moved at least along an optical axis, and preferably, can also be moved in a plane perpendicular (i.e., vertically) to the optical axis direction, by a driving device 25.

A light beam emitted from the light source 18 is expanded by the beam expander, and passes through the half mirror 21 and the reference plane parallel plate 22. One surface 221 of the reference plane parallel plate 22 is a reference surface that internally reflects one part of the light beam from the light source 18 back towards the half mirror 21. The light beam reflected by the surface 221 is a reference light beam.

The other part of the light beam that passes through the reference plane parallel plate 22 is incident on the lens 23. The exit light beam from the lens 23 is reflected by the concave mirror 23 and returns along the same path to the half mirror 21. This light beam is a testing light beam.

The reference light beam and the testing light beam are superimposed and imaged on the image receiving element 29 by the observing lens 27 to form an interference fringe pattern.

The reflecting surface of the concave mirror 24 has a surface accuracy within a tolerance comparable to one tenth of a wavelength of the reference light beam.

The interferometer 2c of FIG. 27 measures the wave front aberration of a reflecting surface 381 of a concave mirror 38 (which is the object under test). The concave mirror 381 under test can be moved along the optical axis by a driving device 39. The interferometer 2c further comprises a light source 30, a beam expander having two lenses 31 and 32, a beam splitter 33, a converging lens 36, a reference plane mirror 34 that is driven by a driving device 35 such as a PZT, an observing lens 40 and an image receiving portion 41 having an image receiving element 42.

A reflecting surface 341 of the reference mirror 34 acts as a reference surface.

A light beam emitted from the light source 30 and expanded by the beam expander is divided by the beam splitter 33 into two components. The transmitted light beam is reflected from the surface 381 to be tested and forms a testing light beam. The reflected light beam is reflected from the reference surface 341 and forms a reference light beam.

The reference light beam and the testing light beam are superimposed by the beam splitter 33 to form an interference fringe pattern on the image receiving element 42 after convergence by the observing lens 40.

The interferometer 2d of FIG. 28 measures the wave front aberration of a reflecting surface 381a of a concave mirror 38a (which is an object under test). The interferometer 2d is almost the same as the interferometer 2c shown in FIG. 27 except a plano-concave left 36a is used instead of the plano-convex converging lens 36.

The interferometer 2e of FIG. 29 measures a wave front aberration of a lens 23 (which is the object under test), in a manner similar to the interferometer 2b shown in FIG. 26. Components of the interferometer 2e which have the same reference numrals as those used in interferer 2b are the same and will not be described below.

The interferometer 2e uses a converging lens 36b and a plane mirror 24a to perform the function of the concave mirror 24 used in interferometer 2b. Further, the plane mirror 24 can be moved along the optical axis by a driving device 25. With this construction an interference fringe pattern can be detected using a converging lens and a plane mirror.

The present disclosure relates to subject matter contained in Japanese patent applications Nos. H5-281963 (filed on Oct. 14, 1993) and H5-353505 (filed on Dec. 27, 1993) which are expressly incorporated herein by reference in their entireties.

What is claimed is:

1. A device for measuring a characteristic of an optical element, said device comprising:

means for forming an interference fringe pattern using a reference light beam reflected from a reference surface and a test light beam that is guided from said optical element by a light refracting element;

means for detecting said interference fringe pattern, said detecting means outputting data corresponding to said interference fringe pattern;

means for processing said output data, said processing means outputting information of wave front aberration representative of said interference fringe pattern as a predetermined form of a polynomial expression, wherein said polynomial expression includes mathematical terms representative of position errors of said optical element and mathematical terms representative of said characteristic of said optical elements;

means for calculating said mathematical terms;

means for correcting at least one of said mathematical terms representative of said characteristic of said optical element based on a predetermined calculation utilizing a value of at least one of said mathematical terms representative of said position errors; and means for displaying said corrected mathematical terms representative of said characteristic of said optical element.

2. The measuring device of claim 1, wherein said characteristic of said optical element is related to a shape of a surface of said optical element, wherein said correcting means corrects at least one of said mathematical terms, representative of a symmetrical condition of said surface of said optical element, based on at least one of said mathematical terms, representative of said position errors, representing a defocus of said surface.

3. The measuring device of claim 2, wherein said correcting means corrects said mathematical terms representative of said characteristic of said optical element by substituting said at least one of said mathematical terms representative of said position errors into a predetermined equation.

4. The measuring device of claim 3, wherein said light refracting element satisfies the sine condition.

5. The measuring device of claim 2, wherein said correcting means corrects said mathematical terms representative of said characteristic of said optical element by substituting said mathematical terms representative of said position errors into an equation that is experimentally determined during a calibration stage.

6. The measuring device of claim 1, wherein said characteristic of said optical element is related to a shape of a surface of said optical element, wherein said correcting means corrects at least one of said mathematical terms, representative of an asymmetrical condition of said surface of said optical element, based on at least one of said mathematical terms, representative of said position errors, representing a tilt of said surface.

7. The measuring device of claim 6, wherein said correcting means corrects said mathematical terms representative of said characteristic by substituting said mathematical terms representative of said position errors into an equation that is experimentally determined during a calibration stage.

8. The device for measuring a characteristic of an optical element according to claim 1, each said mathematical term representative of said position error comprising a coefficient, said correcting means yielding corrected coefficients.

9. A method for measuring a characteristic of an optical element, said method comprising:

forming an interference fringe pattern using a reference light beam reflected from a reference surface and a test light beam that is guided from said optical element by a light refracting element;

detecting said interference fringe pattern;

outputting data corresponding to said detected interference fringe pattern;

calculating information of wave front aberrations, corresponding to said output data, representative of said interference fringe pattern as a predetermined form of a polynomial expression, wherein said polynomial expression includes mathematical terms representative of position errors of said optical element and mathematical terms representative of said characteristic of said optical element;

calculating said mathematical terms;

correcting at least one of said mathematical terms representative of said characteristic of said optical element based on a predetermined calculation utilizing a value of at least one of said mathematical terms representative of said position errors; and displaying said corrected mathematical terms representative of said characteristic of said optical element.

10. The method of measuring a characteristic of an optical element according to claim 9, each mathematical term representative of said position error comprising a coefficient, the correcting step yielding corrected coefficients.

11. The measuring method of claim 9, wherein in said step of calculating said information, said wave front aberrations are given by an equation as follows:

$$W(\rho,\phi) = \sum_{n=0}^{k} \sum_{l=0}^{n} W_{nl}\rho^n \cos^l \phi$$

$$= W_{11}\rho \sin\phi + W_{12}\rho \cos\phi + W_{20}\rho^2 +$$

$$W_{22}\rho^2 \cos^2\phi + W_{31}\rho^3 \cos\phi +$$

$$W_{32}\rho^3 \sin\phi + W_{40}\rho^4 + W_{51}\rho^3 \cos\phi +$$

$$W_{52}\rho^3 \sin\phi + W_{60}\rho^6 + \ldots$$

where, $\rho = h/h_{max}$ h: incident height, $h_{max}$: maximum incident height, $\phi$: polar coordinate angle, k,l,n: non-negative integers(0,1,2, . . . ), $W_{11}$, $W_{12}$, $W_{20}$, $W_{22}$, $W_{31}$, $W_{32}$, $W_{40}$, $W_{51}$, $W_{52}$, $W_{60}$ :coefficients of each aberration.

12. The measuring method of claim 11, wherein said correcting step corrects said fourth order coefficient $W_{40}$ by substituting said coefficients of said defocus term $W_{20}$ into an equation, given as:

$$A_4 = W_{40} - \frac{1}{4} \cdot NA_0^2 \cdot W_{20}$$

where $NA_0$ is a numerical aperture of a light converging element, and $A_4$ is a correction coefficient of said coefficient $W_{40}$.

13. The measuring method of claim 11, wherein said characteristic of said optical element is related to a shape of a surface of said optical element, wherein said correcting step corrects fourth and higher even order coefficients $W_{40}$, $W_{60}$ . . . which represent symmetrical aberrations of said surface based on a second order coefficient $W_{20}$ which represents a defocus term.

14. The measuring method of claim 11, wherein said correcting step corrects a sixth order coefficient $W_{60}$ by substituting said coefficient $W_{20}$ into an equation, given as;

$$A_6 = W_{60} - \frac{1}{8} \cdot NA_0^4 \cdot W_{20}$$

where $NA_0$ is numerical aperture of a light converging element, and $A_6$ is a correction coefficient of said sixth order coefficient $W_{60}$.

15. A device for measuring a characteristic of an optical element, said device comprising:

means for forming an interference fringe pattern using a reference light beam reflected from a reference surface and a test light beam that is guided from said optical element by a light refracting element;

means for detecting said interference fringe pattern, said detecting means outputting data corresponding to said interference fringe pattern;

means for processing information representative of said interference fringe pattern, said information defining wave front aberrations $W(\rho,\phi)$ as:

$$W(\rho,\phi) = \sum_{n=0}^{k}\sum_{l=0}^{n} W_{nl}\rho^n \cos^l \phi$$

$$= W_{11}\rho \sin\phi + W_{12}\rho \cos\phi + W_{20}\rho^2 +$$

$$W_{22}\rho^2 \cos^2\phi + W_{31}\rho^3 \cos\phi +$$

$$W_{32}\rho^3 \sin\phi + W_{40}\rho^4 + W_{51}\rho^3 \cos\phi +$$

$$W_{52}\rho^3 \sin\phi + W_{60}\rho^6 + \ldots$$

where, $\rho = h/h_{max}$ h: incident height, $h_{max}$: maximum incident height, $\phi$: polar coordinate angle, k,l,n: non-negative integers (0,1,2,....), $W_{11}, W_{12}, W_{20}, W_{22}, W_{31}, W_{32}, W_{40}, W_{51}, W_{52}, W_{60}$: coefficients of each aberration;

a means for calculating said coefficients $W_{11}, W_{12}, W_{20}, W_{22}, W_{31}, W_{32}, W_{40}, W_{51}, W_{52}, W_{60} \ldots$;

means for correcting at least one of said coefficients $W_{31}, W_{32}, W_{40}, W_{51}, W_{52}, W_{60} \ldots$ which are representative of said characteristic of said optical element, based on values of at least one of said coefficients $W_{11}, W_{12}, W_{20}$ which are representative of a position error of said optical element; and means for displaying said corrected coefficients corresponding to said coefficients $W_{31}, W_{32}, W_{40}, W_{51}, W_{52}, W_{60} \ldots$.

16. The measuring device of claim 15, wherein said characteristic of said optical element is related to a shape of a surface of said optical element, wherein said correcting means corrects one of fourth and higher order even coefficients $W_{40}, W_{60} \ldots$ which represent symmetrical aberrations of said surface of said optical element based on a second order coefficient $W_{20}$ which represents a defocus of said surface.

17. The interference fringe pattern measuring apparatus of claim 16, wherein said correcting means corrects fourth and higher order even coefficients $W_{40}, W_{60} \ldots$ during a measurement stage by substituting said coefficient $W_{20}$ into an equation that is determined during a calibration stage, given as:

$$W_{n0}'' = W_{n0}' - (a_n s^{n-2} W_{20}' + b_n s^n)$$

Where, $W_{n0}''$: corrected cofficients of n-th order term;

$W_{n0}'$, $W_{20}'$: coefficients in said measurement stage;

$a_n, b_n$: coefficients of correction experientially determined by said calibration stage;

n: even number equal to and more than 4;

$$s = \frac{r_1}{r_0} = \frac{h_1}{h_0}$$

$h_1$: an incident height of a light beam on said light converging element in said measurement stage;

$r_1$: a radius of an interference fringe pattern measured in said measurement stage;

$h_0$: an incident height of said light beam on said light converging element in said calibration stage;

$r_0$: a radius of said interference fringe pattern image in said calibration stage.

18. The measuring device of claim 16, wherein said correcting means corrects said fourth order coefficient $W_{40}$ by substituting said coefficient $W_{20}$ into an equation:

$$A_4 = W_{40} - \frac{1}{4} \cdot NA_0^2 \cdot W_{20}$$

where $NA_0$ is a numerical aperture of said light converging element, and $A_4$ is a corrected value of said coefficient $W_{40}$.

19. The measuring device of claim 16, wherein said correcting means corrects said sixth order coefficient $W_{60}$ by substituting said coefficient $W_{20}$ into an equation;

$$A_6 = W_{60} - \frac{1}{8} \cdot NA_0^4 \cdot W_{20}$$

where $NA_0$ is numerical aperture of said light converging element, and $A_6$ is a corrected coefficient of sixth order coefficient $W_{60}$.

20. The measuring device of claim 15, wherein said characteristic of said optical element is related to a shape of a surface of said optical element, wherein said correcting means corrects third and higher order odd coefficients $W_{31}, W_{51} \ldots$ and/or $W_{32}, W_{52} \ldots$ which represent asymmetrical aberrations of said surface based on said first order coefficients $W_{11}$, and/or $W_{12}$ which represent a tilt of said surface.

21. The measuring device of claim 20, wherein said correcting means corrects said third and higher order odd coefficients $W_{31}, W_{51} \ldots$ and/or $W_{32}, W_{52} \ldots$ during a measurement stage by substituting said coefficients $W_{11}$ and/or $W_{12}$ into an equation that is determined during a calibration stage, given as:

$$W_{nm}'' = W_{nm}' - (a_{nm} s^{n-1} W_{lm}' + b_{nm} s^n)$$

Where, $W_{nm}''$: corrected coefficients of n-th order terms;

$W_{nm}'$, $W_{lm}'$: coefficients in said measurement stage;

$a_{nm}, b_{nm}$: coefficients of correction experientially determined by said calibration stage;

n: odd number greater than or equal to 3;

$$s = \frac{r_1}{r_0} = \frac{h_1}{h_0}$$

$h_1$: a height of a light beam incident on a light converging element in said measurement stage;

$r_1$: a radius of an interference fringe pattern in said measurement stage;

$h_0$: a height to said light beam incident on said light converging element in said calibration stage;

$r_0$: a radius of said interference fringe pattern image in said calibration stage.

22. A method of measuring a characteristic of an optical element, said method comprising:

forming a reference interference fringe pattern using a reference light beam reflected from a reference surface and a test light beam that is guided from a reference optical element by a light refracting element;

detecting said reference interference fringe pattern;

determining effects of at least one of defocus and tilt of said reference optical element on said detected interference fringe pattern by a predetermined calculation;

storing said determined effects in a memory;

forming an interference fringe pattern using said reference light beam reflected from said reference surface and another test light beam that is guided from said optical element by said light refracting element;

detecting said interference fringe pattern;

outputting data corresponding to said detected interference fringe pattern;

calculating information, corresponding to said output data, representative of said interference fringe pattern as a predetermined form of a polynomial expression; and correcting said polynomial expression using said determined effects stored in memory as correcting data.

23. The method of measuring a characteristic of an optical element according to claim 22, each mathematical term representative of said position error comprising a coefficient, the correcting step yielding corrected coefficients.

24. A device for measuring a characteristic of an optical element, said device comprising:

a system that forms an interference fringe pattern using a reference light beam that is reflected from a reference surface and a test light beam that is guided from said optical element by a light reflecting element;

a system that detects said interference fringe pattern, said detecting system outputting data corresponding to said interference fringe pattern;

a system that processes said data, said processing system outputting information of wave front aberration representative of said interference fringe pattern, as a predetermined form of a polynomial expression wherein said polynomial expression includes mathematical terms representative of position errors of said optical element and mathematical terms representative of said characteristic of said optical element;

a system that calculates said mathematical terms;

a system that corrects at least one of said mathematical terms representative of said characteristic of said optical element based on a predetermined calculation utilizing a value of at least one of said mathematical terms representative of said position error; and a system that displays said corrected mathematical terms representative of said characteristic of said optical element.

25. The measuring device of claim 24, wherein said characteristic of said optical element is related to a shape of a surface of said optical element, wherein said correcting system corrects at least one of said mathematical terms, representative of a symmetrical condition of said surface of said optical element, based on at least one of said mathematical terms, representative of said position errors, representing a defocus of said surface.

26. The measuring device of claim 25, wherein said correcting system corrects said mathematical terms representative of said characteristic of said optical element by substituting said mathematical terms representative of said position errors into an equation that is experimentally determined during a calibration stage.

27. The measuring device of claim 25, wherein said correcting system corrects said mathematical terms representative of said characteristic of said optical element by substituting said at least one of said mathematical terms representative of said position errors into a predetermined equation.

28. The measuring device of claim 27, wherein said light refracting element satisfies the sine condition.

29. The measuring device of claim 24, wherein said characteristic of said optical element is related to a shape of a surface of said optical element, wherein said correcting system corrects at least one of said mathematical terms, representative of an asymmetrical condition of said surface of said optical element, based on at least one of said mathematical terms, representative of said position errors, representing a tilt of said surface.

30. The measuring device of claim 29, wherein said correcting system corrects said mathematical terms representative of said characteristic of said optical element by substituting said mathematical terms representative of said position errors into an equation that is experimentally determined during a calibration stage.

31. A device for measuring a characteristic of an optical element, said device comprising:

a system that forms an interference fringe pattern using a reference light beam reflected from a reference surface and a test light beam that is guided from said optical element by a light refracting element;

a system that detects said interference fringe pattern, said detecting means outputting data corresponding to said interference fringe pattern;

a system that processes information representative of said interference fringe pattern, said information defining wave front aberrations $W(\rho, \phi)$ as:

$$W(\rho,\phi) = \sum_{n=0}^{k} \sum_{l=0}^{n} W_{nl}\rho^n \cos^l \phi$$

$$= W_{11}\rho \sin\phi + W_{12}\rho \cos\phi + W_{20}\rho^2 +$$

$$W_{22}\rho^2 \cos^2\phi + W_{31}\rho^3 \cos\phi +$$

$$W_{32}\rho^3 \sin\phi + W_{40}\rho^4 + W_{51}\rho^3 \cos\phi +$$

$$W_{52}\rho^3 \sin\phi + W_{60}\rho^6 + \ldots$$

where, $\rho = h/h_{max}$ h:incident height, $h_{max}$:maximum incident height, $\phi$:polar coordinate angle, k,l,n:non-negative integers (0,1,2, . . . ), $W_{11}$, $W_{12}$, $W_{20}$, $W_{22}$, $W_{31}$, $W_{32}$, $W_{40}$, $W_{51}$, $W_{52}$, $W_{60}$, :coefficients of each aberration;

a calculating system that calculates said coefficients $W_{11}$, $W_{12}$, $W_{20}$, $W_{22}$, $W_{31}$, $W_{32}$, $W_{40}$, $W_{51}$, $W_{52}$, $W_{60}$ . . . ;

a system that corrects at least one of said coefficients $W_{31}$, $W_{32}$, $W_{40}$, $W_{51}$, $W_{52}$, $W_{60}$ which are representative of said characteristic of said optical element, based on values of at least one of said coefficients $W_{11}$, $W_{12}$, $W_{20}$ which are representative of a position error of said optical element; and a system that displays said corrected coefficients corresponding to said coefficients $W_{31}$, $W_{32}$, $W_{40}$, $W_{51}$, $W_{52}$, $W_{60}$ . . . .

32. The measuring device of claim 31, wherein said characteristic of said optical element is related to a shape of a surface of said optical element, wherein said correcting system corrects one of fourth and higher order even coefficients $W_{40}$, $W_{60}$, . . . which represent symmetrical aberrations of said surface of said optical element based on a second order coefficient $W_{20}$ which represents a defocus of said surface.

33. The measuring device of claim 32, wherein said correcting system corrects said fourth order coefficient $W_{40}$ by substituting said coefficient $W_{20}$ into an equation:

$$A_4 = W_{40} - \tfrac{1}{4} \cdot NA_0{}^2 \cdot W_{20}$$

where $NA_0$, is a numerical aperture of a light converging element, and $A_4$ is a corrected value of said coefficient $W_{40}$.

34. The measuring device of claim 32, wherein said correcting system corrects said sixth order coefficient $W_{60}$ by substituting said coefficient $W_{20}$ into an equation;

$$A_6 = W_{60} - \tfrac{1}{8} \cdot NA_0{}^4 \cdot W_{20}$$

where $NA_0$ is a numerical aperture of a light converging element, and $A_6$ is a corrected coefficient of said sixth order coefficient $W_{60}$.

35. The measuring device of claim 32, wherein said correcting system corrects a fourth and higher order even coefficients $W_{40}, W_{60} \ldots$ during a measurement stage by substituting a coefficient $W_{20}$ into a calibration stage determined equation:

$$W_{n0}'' = W_{n0}' - (a_n s^{n-2} W_{20}' + b_n s^n)$$

where, $W_{n0}''$:corrected coefficients of n-th order term;

$W_{n0}'$, $W_{20}'$:coefficients in said measurement stage;

$a_n, b_n$:coefficients of correction experimentally determined by said calibration stage;

n:Even number greater than or equal to 4;

$$s = r_1/r_0 = h_1/h_0$$

$h_1$:an incident height of a light beam on said light converging element in said measurement stage;

$r_1$:a radius of an interference fringe pattern measured in said measurement stage;

$h_0$:an incident height of said light beam on said light converging element in said calibration stage;

$r_0$:a radius of said interference fringe pattern image in said calibration stage.

36. The measuring device of claim 31, wherein said characteristic of said optical element is related to a shape of a surface of said optical element, wherein said correcting system corrects third and higher order odd coefficients $W_{31}, W_{51} \ldots$ and/or $W_{32}, W_{52} \ldots$, which represent asymmetrical aberrations of said surface based on first order coefficients $W_{11}$ and/or $W_{12}$ which represent a tilt of said surface.

37. The measuring device of claim 36, wherein said correcting system corrects said third and higher order odd coefficients $W_{31}, W_{51} \ldots$ and/or $W_{32}, W_{52} \ldots$ during a measurement stage by substituting said coefficients $W_{11}$, and/or $W_{12}$ into a calibration stage determined equation:

$$W_{nm}'' = W_{nm}' - (a_{nm} s^{n-1} W_{lm}' + b_{nm} s^n)$$

where, $W_{nm}''$:corrected coefficients of n-th order terms;

$W_{nm}'$, $W_{lm}40$ :coefficients in said measurement stage;

$a_{nm}, b_{nm}$:coefficients of correction experimentally determined by said calibration stage;

n:Odd number greater than or equal to 3;

$$s = r_1/r_0 = h_1/h_0$$

$h_1$:a height of a light beam incident on a light converging element in said measurement stage;

$r_1$:a radius of an interference fringe pattern in said measurement stage;

$h_0$:a height to said light beam incident on said light converging element in said calibration stage;

$r_0$:a radius of said interference fringe pattern image in said calibration stage.

* * * * *

UNITED STATES PATENT AND TRADEMARK OFFICE
CERTIFICATE OF CORRECTION

PATENT NO. : 5,768,150
DATED : June 16, 1998
INVENTOR(S) : SONODA et al.

Page 1 of 2

It is certified that error appears in the above-identified patent and that said Letters Patent is hereby corrected as shown below:

At column 20, line 50 (claim 14, line 5), of the printed patent, after "is" insert —a—.

At column 21, line 47 (claim 17, line 7), of the printed patent, "$W_{n0}''=W_{n0'}-(a_n s^{n-2} W_{20'+b_n} s^n)$" should be —$W_{n0}''=W_{n0}' -(a_n s^{n-2} W_{20}' +b_n s^n)$—.

At column 22, line 2 (claim 18, line 2) delete "said" and insert —a—.

At column 22, line 8 (claim 18, line 5) delete "said" and insert —a—.

At column 22, line 18 (claim 19, line 5) after "is" insert —a—.

At column 22, line 18 (claim 19, line 5) delete "said" and insert —a—.

At column 22, line 28 (claim 20, line 7) delete "said".

UNITED STATES PATENT AND TRADEMARK OFFICE
CERTIFICATE OF CORRECTION

PATENT NO. : 5,768,150
DATED : June 16, 1998
INVENTOR(S) : SONODA et al.

It is certified that error appears in the above-identified patent and that said Letters Patent is hereby corrected as shown below:

At column 25, line 14 (claim 34, line 5) delete "$A_6 = W_{60} \text{\textonesixth} \bullet NA_0^4 \bullet W_{20}$" and insert ---$A_6 = W_{60} - \text{\textonesixth} \bullet NA_0^4 \bullet W_{20}$---.

At column 26, line 24 (claim 37, line 9) delete "$W_{1m'}\ 40$" and insert ---$W_{1m'}$---.

At column 26, line 28 (claim 37, line 14) change "$r_1/r_0'$" to read ---$r_1/r_0$---.

Signed and Sealed this

Eleventh Day of April, 2000

Attest:

*Attesting Officer*

Q. TODD DICKINSON
*Director of Patents and Trademarks*